United States Patent
Dutka et al.

(10) Patent No.: US 10,060,443 B2
(45) Date of Patent: Aug. 28, 2018

(54) AIRFOIL SHAPE FOR TWELFTH STAGE COMPRESSOR STATOR VANE

(71) Applicant: General Electric Company, Schenectady, NY (US)

(72) Inventors: Michael James Dutka, Greenville, SC (US); Antanu Sadhu, Bangalore (IN); Sharan Shanti, Bangalore (IN); Sunil Rajagopal, Bangalore (IN)

(73) Assignee: General Electric Company, Schenectady, NY (US)

(*) Notice: Subject to any disclaimer, the term of this patent is extended or adjusted under 35 U.S.C. 154(b) by 130 days.

(21) Appl. No.: 15/296,823

(22) Filed: Oct. 18, 2016

(65) Prior Publication Data

US 2018/0106272 A1    Apr. 19, 2018

(51) Int. Cl.
| | | |
|---|---|---|
| *F01D 9/02* | (2006.01) | |
| *F04D 29/54* | (2006.01) | |
| *F02C 3/06* | (2006.01) | |
| *F04D 19/02* | (2006.01) | |
| *F04D 29/32* | (2006.01) | |
| *F04D 29/38* | (2006.01) | |

(52) U.S. Cl.
CPC .............. *F04D 29/544* (2013.01); *F02C 3/06* (2013.01); *F04D 19/02* (2013.01); *F04D 29/324* (2013.01); *F04D 29/384* (2013.01); *F05D 2220/32* (2013.01); *F05D 2240/35* (2013.01); *F05D 2250/74* (2013.01)

(58) Field of Classification Search
CPC .... F04D 29/324; F04D 29/542; F04D 29/544; F01D 5/141; F01D 9/02; F05D 2250/74
See application file for complete search history.

(56) References Cited

U.S. PATENT DOCUMENTS

| 5,980,209 A | * | 11/1999 | Barry | ..................... F01D 5/141 |
|---|---|---|---|---|
| | | | | 416/193 A |
| 7,186,090 B2 | | 3/2007 | Tomberg et al. | |
| 7,329,092 B2 | | 2/2008 | Keener et al. | |

(Continued)

OTHER PUBLICATIONS

U.S. Appl. No. 15/296,757, filed Oct. 18, 2016, Michael James Dutka.

(Continued)

*Primary Examiner* — Mark Laurenzi
*Assistant Examiner* — Shafiq Mian
(74) *Attorney, Agent, or Firm* — Fletcher Yoder, P.C.

(57) ABSTRACT

A system is provided, including an airfoil. The airfoil includes a first suction portion of a nominal airfoil profile substantially in accordance with Cartesian coordinate values of X, Y, and Z of a suction side as set forth in TABLE I to a maximum of three decimal places, wherein the X and Y values of the suction side are coordinate values that couple together to define suction side sections of the first suction portion of the nominal airfoil profile at each Z coordinate value, the suction side sections of the first suction portion of the nominal airfoil profile are coupled together to define the first suction portion, the airfoil includes an airfoil length along a Z axis, the first suction portion comprises a first portion length along the Z axis, the first portion length is less than or equal to the airfoil length, and the Cartesian coordinate values of X, Y, and Z are non-dimensional values convertible to dimensional distances.

24 Claims, 6 Drawing Sheets

(56) References Cited

U.S. PATENT DOCUMENTS

| | | |
|---|---|---|
| 7,396,211 B2 | 7/2008 | Tomberg et al. |
| 7,467,926 B2 | 12/2008 | Stampfli et al. |
| 7,494,321 B2 | 2/2009 | Latimer et al. |
| 7,494,322 B2 | 2/2009 | Spracher et al. |
| 7,494,323 B2 | 2/2009 | Douchkin et al. |
| 7,497,665 B2 | 3/2009 | King et al. |
| 7,510,378 B2 | 3/2009 | LaMaster et al. |
| 7,513,748 B2 | 4/2009 | Shrum et al. |
| 7,513,749 B2 | 4/2009 | Duong et al. |
| 7,517,188 B2 | 4/2009 | McGowan et al. |
| 7,517,190 B2 | 4/2009 | Latimer et al. |
| 7,517,196 B2 | 4/2009 | Shrum et al. |
| 7,517,197 B2 | 4/2009 | Duong et al. |
| 7,520,729 B2 | 4/2009 | McGowan et al. |
| 7,524,170 B2 | 4/2009 | Devangada et al. |
| 7,530,793 B2 | 5/2009 | Huskins et al. |
| 7,534,092 B2 | 5/2009 | Columbus et al. |
| 7,534,093 B2 | 5/2009 | Spracher et al. |
| 7,534,094 B2 | 5/2009 | Tomberg et al. |
| 7,537,434 B2 | 5/2009 | Cheruku et al. |
| 7,537,435 B2 | 5/2009 | Radhakrishnan et al. |
| 7,540,715 B2 | 6/2009 | Latimer et al. |
| 7,566,202 B2 * | 7/2009 | Noshi ............... F01D 5/141 416/223 A |
| 7,568,892 B2 * | 8/2009 | Devangada ......... F01D 5/141 416/223 A |
| 7,572,104 B2 | 8/2009 | Hudson et al. |
| 7,572,105 B2 * | 8/2009 | Columbus ........... F01D 5/141 416/223 A |
| 7,985,053 B2 * | 7/2011 | Schott ................. F01D 9/04 416/223 A |
| 7,993,100 B2 * | 8/2011 | Bonini ................ F01D 9/041 415/189 |
| 7,997,861 B2 * | 8/2011 | Hudson ............... F01D 5/141 415/189 |
| 8,038,390 B2 | 10/2011 | Hudson et al. |
| 8,172,543 B2 | 5/2012 | Delvernois et al. |
| 8,186,963 B2 | 5/2012 | LaMaster et al. |
| 8,192,168 B2 | 6/2012 | Bonini et al. |
| 8,215,917 B2 | 7/2012 | LaMaster et al. |
| 8,366,397 B2 | 2/2013 | Blohm et al. |
| 8,491,260 B2 | 7/2013 | Dutka et al. |
| 8,556,588 B2 | 10/2013 | Shrum et al. |
| 8,573,945 B2 | 11/2013 | Wang et al. |
| 8,926,287 B2 * | 1/2015 | Dutka ................. F04D 29/544 416/223 A |
| 8,936,441 B2 * | 1/2015 | McKeever ........... F01D 5/141 416/223 A |
| 8,961,119 B2 * | 2/2015 | McKeever ........... F01D 5/141 415/191 |
| 9,017,019 B2 * | 4/2015 | McKeever ........... F04D 29/542 415/191 |
| 9,145,777 B2 | 9/2015 | Dutka et al. |
| 9,175,693 B2 * | 11/2015 | Dutka ................. F04D 29/324 |

OTHER PUBLICATIONS

U.S. Appl. No. 15/272,220, filed Sep. 21, 2016, Paul G. DeIvernois.
U.S. Appl. No. 15/272,244, filed Sep. 21, 2016, Paul G. DeIvernois.
U.S. Appl. No. 15/272,278, filed Sep. 21, 2016, Paul G. DeIvernois.
U.S. Appl. No. 15/271,864, filed Sep. 21, 2016, Marc Edward Blohm.
U.S. Appl. No. 15/272,018, filed Sep. 21, 2016, John David Stampfli.
U.S. Appl. No. 15/272,008, filed Sep. 21, 2016, John David Stampfli.
U.S. Appl. No. 15/272,301, filed Sep. 21, 2016, Michael Healy.
U.S. Appl. No. 15/272,546, filed Sep. 22, 2016, Lakshmanan Valliappan.
U.S. Appl. No. 15/272,577, filed Sep. 22, 2016, Lakshmanan Valliappan.
U.S. Appl. No. 15/273,361, filed Sep. 22, 2016, Matthew John McKeever.
U.S. Appl. No. 15/273,045, filed Sep. 22, 2016, Marc Edward Blohm.
U.S. Appl. No. 15/273,179, filed Sep. 22, 2016, Marc Edward Blohm.
U.S. Appl. No. 15/272,676, filed Sep. 22, 2016, Marc Edward Blohm.
U.S. Appl. No. 15/272,716, filed Sep. 22, 2016, Marc Edward Blohm.
U.S. Appl. No. 15/273,340, filed Sep. 22, 2016, Paul Griffin DeIvernois.
U.S. Appl. No. 15/274,352, filed Sep. 23, 2016, Michael James Dutka.
U.S. Appl. No. 15/277,219, filed Sep. 27, 2016, Francesco Soranna.
U.S. Appl. No. 15/277,576, filed Sep. 27, 2016, John David Stampfli.
U.S. Appl. No. 15/278,994, filed Sep. 28, 2016, Moorthi Subramaniyan.
U.S. Appl. No. 15/279,004, filed Sep. 28, 2016, Moorthi Subramaniyan.
U.S. Appl. No. 15/280,943, filed Sep. 29, 2016, Paul G. DeIvernois.
U.S. Appl. No. 15/280,957, filed Sep. 29, 2016, Sunil Rajagopal.
U.S. Appl. No. 15/282,313, filed Sep. 30, 2016, Matthew John McKeever.
U.S. Appl. No. 15/285,258, filed Oct. 4, 2016, Moorthi Subramaniyan.
U.S. Appl. No. 15/286,545, filed Oct. 5, 2016, Pabakaran Modachur Krishnan.
U.S. Appl. No. 15/286,556, filed Oct. 5, 2016, Pabakaran Modachur Krishnan.

* cited by examiner

US 10,060,443 B2

1

AIRFOIL SHAPE FOR TWELFTH STAGE COMPRESSOR STATOR VANE

BACKGROUND OF THE INVENTION

The subject matter disclosed herein relates to compressor stator vanes, and more specifically, to a twelfth stage compressor stator vane.

Compressors are used in a variety of industries and systems to compress a gas, such as air. For example, gas turbine engines typically include a compressor to provide compressed air for combustion and cooling. Compressors typically include a rotor assembly and a stator assembly. In multi-stage compressors, the rotor assembly may include multiple rows (e.g., rotor stages) each row having multiple rotor blades. Likewise, the stator assembly may include multiple rows (e.g., stator stages) each row having multiple stator vanes. The rotor assembly is designed to rotate with respect to the stator assembly, compressing an intake fluid as the fluid traverses the compressor.

BRIEF DESCRIPTION OF THE INVENTION

Certain embodiments commensurate in scope with the originally claimed subject matter are summarized below. These embodiments are not intended to limit the scope of the claimed invention, but rather these embodiments are intended only to provide a brief summary of possible forms of the subject matter. Indeed, the invention may encompass a variety of forms that may be similar to or different from the embodiments set forth below.

In a first embodiment, a system includes an airfoil. The airfoil includes a first suction portion of a nominal airfoil profile substantially in accordance with Cartesian coordinate values of X, Y, and Z of a suction side as set forth in TABLE I to a maximum of three decimal places, wherein the X and Y values of the suction side are coordinate values that couple together to define suction side sections of the first suction portion of the nominal airfoil profile at each Z coordinate value, the suction side sections of the first suction portion of the nominal airfoil profile are coupled together to define the first suction portion, the airfoil includes an airfoil length along a Z axis, the first suction portion comprises a first portion length along the Z axis, the first portion length is less than or equal to the airfoil length, and the Cartesian coordinate values of X, Y, and Z are non-dimensional values convertible to dimensional distances.

In a second embodiment, a system includes an airfoil. The airfoil includes a suction side of a nominal airfoil profile substantially in accordance with Cartesian coordinate values of X, Y, and Z of the suction side as set forth in TABLE I to a maximum of three decimal places, wherein the X and Y values of the suction side are coordinate values that couple together to define suction side sections of the suction side of the nominal airfoil profile at each Z coordinate value, the suction side sections of the suction side of the nominal airfoil profile are coupled together to define the suction side, and the Cartesian coordinate values of X, Y, and Z are non-dimensional values convertible to dimensional distances.

In a third embodiment, a system includes an airfoil. The airfoil includes a nominal airfoil profile substantially in accordance with Cartesian coordinate values of X, Y, and Z as set forth in TABLE I to a maximum of three decimal places, wherein the X and Y values are coordinate values that couple together to define airfoil sections of the nominal airfoil profile at each Z coordinate value, the airfoil sections

2 of the nominal airfoil profile are coupled together to define an entirety of the airfoil, and the Cartesian coordinate values of X, Y, and Z are non-dimensional values convertible to dimensional distances.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION OF THE INVENTION

Figure 1:
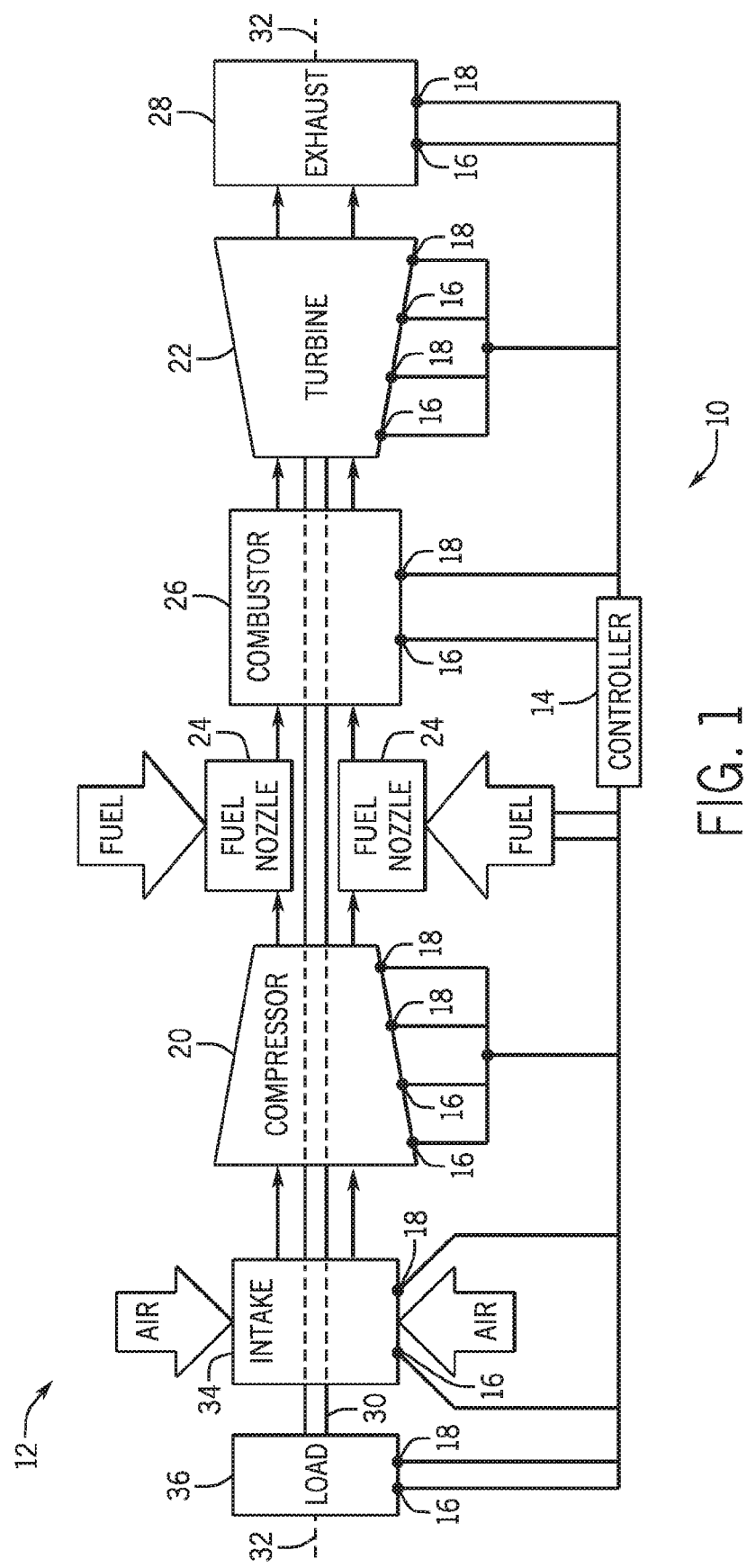
FIG. 1 is a block diagram of an embodiment of a gas turbine system having a multi-stage axial compressor.

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

The disclosed embodiments include a multi-stage axial compressor, which may be a standalone unit or part of a multi-stage rotary machine such as a gas turbine system. In certain embodiments, the multi-stage axial compressor includes a plurality of rotor stages and corresponding stator stages, each rotor stage and stator stage including a plurality of airfoils (e.g., blades or vanes) with a specific airfoil profile. During operation, a compressible fluid (e.g., gas such as air, oxygen, oxygen enriched air, oxygen reduced air, exhaust gas, nitrogen, etc.) may enter the multi-stage axial compressor through an inlet system, and each stage of the multi-stage axial compressor will generally increase the pressure and temperature of the compressible fluid by a certain amount. In a gas turbine system, a compressed fluid may then be delivered, for example, via an outlet system, to a combustor for combustion with a fuel. The amount of pressure and temperature increase at each stage of the multi-stage axial compressor may depend on particular operating conditions, such as speed, inlet boundary conditions (e.g., flow, pressure, temperature, composition, and so forth), outlet boundary conditions (e.g., flow resistance, and so forth), and stage efficiency.

During compression, an energy level of the compressible fluid may increase as the compressible fluid flows through the multi-stage axial compressor due to the exertion of a torque on the fluid by the rotating rotor blades. The stator's stationary vanes slow the compressible fluid, converting a circumferential component of the flow into pressure. An airfoil profile or design of the airfoil (e.g., rotor blades and/or stator vanes) may directly affect compression of the compressible fluid. Airfoil profiles described herein may be more optimized and matched for specific velocities and turning speeds. Further, the airfoil profiles described herein may be more optimized for specific stages of the multi-stage axial compressor with a specific total number of stages. Additionally, the airfoil profiles described herein may be designed for compressor rotor blades, compressor stator vanes, or any combination thereof. In certain embodiments, the airfoil profiles described herein may be designed for compressor rotor blades and/or compressor stator vanes in any one or more stages of a multi-stage axial compressor with 2, 3, 4, 5, 6, 7, 8, 9, 10, 11, 12, 13, 14, 15, 16, 17, 18, 19, or 20 stages. More specifically, in certain embodiments, the airfoil profiles described herein may be designed for compressor rotor blades and/or compressor stator vanes in stage 1, 2, 3, 4, 5, 6, 7, 8, 9, 10, 11, 12, 13, and/or 14 of a 14 stage axial compressor. For example, in certain embodiments, the airfoil profiles described herein may be more optimized for a twelfth stage airfoil (e.g., a rotor blade or stator vane) of a 14 stage axial compressor. The airfoils (e.g., blades or vanes) described herein may be described in terms of X, Y, and Z values set forth in certain table(s) described herein that define airfoil sections of the airfoils. In certain embodiments the X, Y, and Z values may describe suction side airfoil surfaces, pressure side airfoil surfaces, or a combination thereof. The X, Y, and Z values may include coordinate values in a Cartesian coordinate system, including negative and positive values denoting sides that are opposite to each other from a certain axis (e.g., X, Y, Z axis).

Turning now to FIG. 1, the figure is a block diagram of an embodiment of a turbine system 10 that includes a gas turbine engine 12 and a controller 14 (e.g., electronic and/or processor-based controller). The controller 14 may be communicatively coupled to a variety of sensors 16 and actuators 18 disposed in various components of the gas turbine engine 12. Signals received via the sensors 16 may be used to derive control actions executable via the actuators 18. The illustrated gas turbine engine 12 includes a compressor 20 (e.g., a multi-stage axial compressor or compressor section), a turbine 22 (e.g., a multi-stage turbine or turbine section), and fuel nozzles 24 coupled to one or more combustors 26 (e.g., compressor section). The compressor 20 and turbine 22 each may have any number of rows stages of rotor blades and stator vanes (e.g., 1 to 20). As discussed in detail below, an embodiment of an airfoil profile is provided for use with airfoils (e.g., rotor blades or stator vanes) in one or more stages of the compressor 20. However, before presenting details of the airfoil profile, the following discussion provides a brief description of the gas turbine engine 12 and its operation.

In operation, the compressor 20 is configured to compress a compressible fluid (e.g., gas such as air, oxygen, and/or exhaust gas), and deliver the compressed fluid to the fuel nozzles 24 and/or combustors 26. Although the compressible fluid may include any suitable gas, the following discussion may generally refer to the compressible fluid as an oxidant (e.g., air) as one non-limiting example. The fuel nozzles 24 are configured to supply fuel (e.g., from one or more fuel supplies) into the one or more combustors 26 (e.g., in combustion chambers), which combust the fuel with the oxidant (e.g., air) to generate hot combustion gases to drive the turbine 22. The fuel nozzles 24 may be designed as pre-mix fuel nozzles 24 and/or diffusion fuel nozzles 24. Pre-mix fuel nozzles 24 mix the fuel with the oxidant (e.g., air) to create pre-mix type flames. Diffusion fuel nozzles 24 do not premix the fuel with the oxidant, and thus create diffusion type flames. Regardless of the type of flames, the hot combustion gas flows from the combustors 26 into the turbine 22, thereby driving rotation of one or more stages of turbine blades coupled to a turbine rotor and shaft 30 along an axis 32. Eventually, the hot combustion gas exits the turbine 22 through an exhaust outlet 28 (e.g., exhaust stack, exhaust end). In the illustrated embodiment, the shaft 30 is coupled to the compressor 20 and a load 36, such that rotation of the shaft 30 also drives rotation of the compressor 20 and the load 36. The compressor 20 may intake the oxidant (e.g., air) through an air intake 34, which may include filters, thermal control systems, or any other preconditioning systems. The load 36 may include an electrical generator, a rotary machine, a propulsion system of a vehicle, or any other suitable device.

The airfoil profile described in further detail below may be used in any stage of the compressor 20 (e.g., multi-stage axial compressor with any number of stages of rotor blades and stator vanes). The compressor 20 may include rotating blades and stationary vanes (e.g., airfoils) that may be disposed in rows or stages, described in more detail below. The oxidant (e.g., air) may be progressively compressed in stages or rows of rotating blades and corresponding stator vanes as the air moves downstream in the compressor 20. In the depicted embodiment, the compressor 20 is a multi-stage axial compressor 20 having at least two rows or stages of blades and vanes. For example, in certain embodiments, the multi-stage axial compressor 20 may have 14 rows or stages of compressor blades and vanes.

Figure 2:
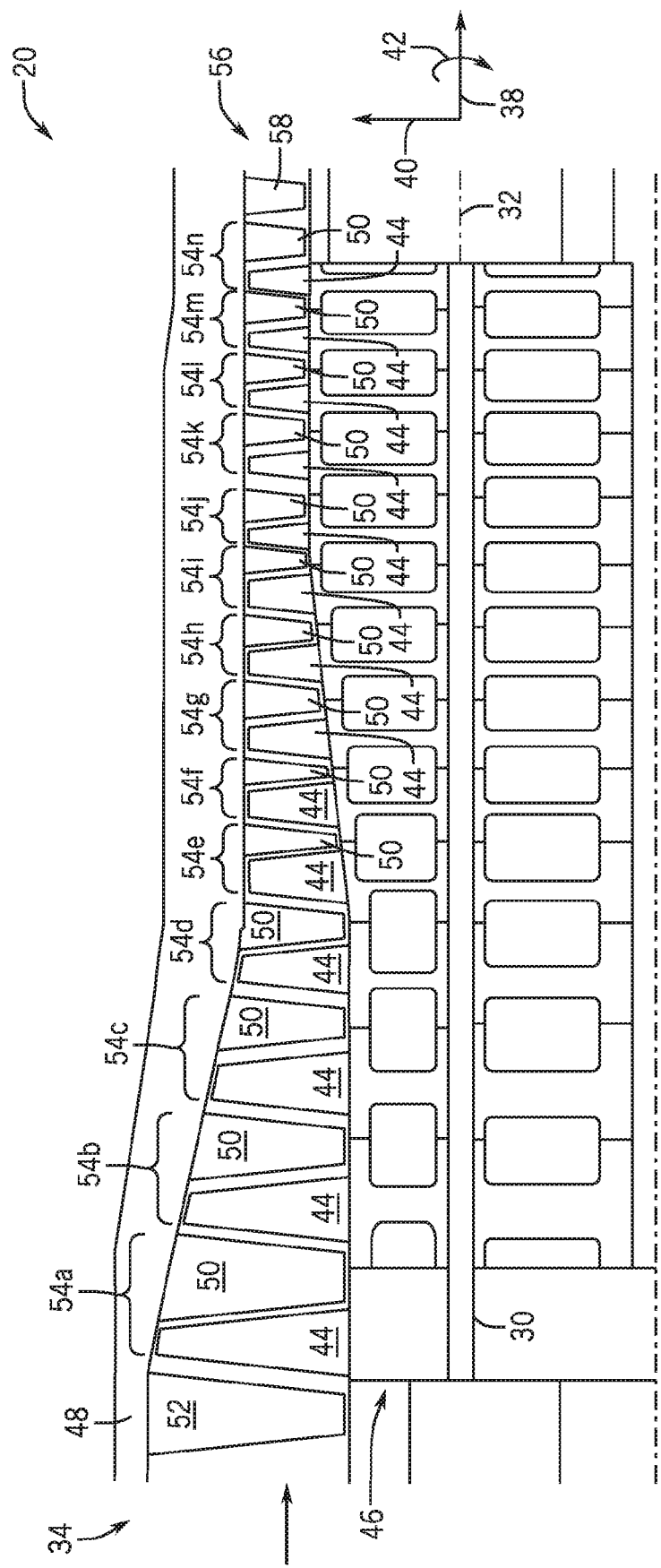
FIG. 2 is a cross-sectional side view of an embodiment of the gas turbine engine of FIG. 1, illustrating stages of blades and vanes of the multi-stage axial compressor.

It may be beneficial to illustrate a more detailed view of certain components of the gas turbine engine 12. Accordingly, FIG. 2 is a cross-sectional side view of an embodiment of the compressor 20 of the gas turbine engine 12 of FIG. 1. Throughout the discussion of FIG. 2, a set of axes will be referenced. These axes are based on a cylindrical coordinate system and point in an axial direction 38 (e.g., downstream), a radial direction 40, and a circumferential direction 42. For example, the axial direction 38 extends downstream through the compressor 20 generally parallel to the axis 32, the radial direction 40 extends away from the axis 32, and the circumferential direction 42 extends around the axis 32.

In operation, air enters the compressor 20 in the axial direction 38 through the air intake 34 and may be pressurized in the multi-stage axial compressor 20. The compressed air may then be mixed with fuel for combustion within the combustor 26 to drive the turbine 22 to rotate the shaft 30 in the circumferential direction 42 and, thus, the multi-stage axial compressor 20 and the load 36. The rotation of the shaft 30 also causes one or more blades 44 (e.g., compressor rotor blades) within the multi-stage axial compressor 20 to draw in and pressurize the air received by the air intake 34.

The multi-stage axial compressor 20 may include a rotor assembly 46 having multiple rotor blades 44 surrounded by a static casing 48 having multiple stator vanes 50 (e.g., variable stator vanes and/or fixed stator vanes). In some embodiments, the static casing 48 of the compressor 20 or the air intake 34 may have one or more sets of inlet guide vanes 52 (IGVs) (e.g., variable IGV stator vanes) that may control flows into the compressor 20. Each variable stator vane 50 (including each variable IGV stator vane 52) may be configured to vary its vane angle relative to the gas flow (e.g. air flow) by rotating the vane 50, 52 about an axis of rotation (e.g., radially oriented vane shaft). However, each variable stator vane 50 may be otherwise stationary relative to the rotor blades 44. In certain embodiments, each variable stator vane 50 may be coupled to an actuator 18 (e.g., electric drive, pneumatic drive, or hydraulic drive), which is coupled to a controller 14 configured to vary the vane angle in response to feedback from sensors 16. Each fixed stator vane 50 may be configured to remain in a fixed angular position, such that the vane angle does not vary. The compressor 20 may include a plurality of rows or stages 54, such as between 2 to 30, 2 to 25, 2 to 20, 2 to 14, or 2 to 10 rows or stages, or any specific number or range therebetween. In each stage, the multi-stage axial compressor 20 may include 2 to 1000, 5 to 500, or 10 to 100 rotor blades 44, and 2 to 1000, 5 to 500, or 10 to 100 stator vanes 50. In particular, the illustrated embodiment of the multi-stage axial compressor 20 includes 14 stages. It may be appreciated that each stage 54 has a set of rotor blades 44 disposed at a first axial position and a set of stator vanes 50 disposed at a second axial position along the length of the compressor 20. In other words, each stage 54 has the rotor blades 44 and stator vanes 50 axially offset from one another, such that the compressor 20 has an alternating arrangement of rotor blades 44 and stator vanes 50 one set after another along the length of the compressor 20. Each set of rotor blades 44 extends (e.g., in a spaced arrangement) in the circumferential direction 42 about the shaft 30, and each set of stator vanes 50 extends (e.g., in a spaced arrangement) in the circumferential direction 42 within the static casing 48. While the compressor 20 may include greater or fewer stages 54 than 14, FIG. 2 illustrates an embodiment of the compressor 20 with 14 stages 54 identified as follows: first stage 54a, second stage 54b, third stage 54c, fourth stage 54d, fifth stage 54e, sixth stage 54f, seventh stage 54g, eighth stage 54h, ninth stage 54i, tenth stage 54j, eleventh stage 54k, twelfth stage 54l, thirteenth stage 54m, and fourteenth stage 54n. In certain embodiments, each stage 54 may include rotor blades 44 and stator vanes 50 (e.g., fixed stator vanes 50 and/or variable stator vanes 50). For example, in certain embodiments, earlier stages 54 (e.g., 54a, 54b, 54c, etc.) may include variable stator vanes 50, while later stages 54 may include fixed stator vanes 50.

The airfoil described in the TABLE I below may describe either a rotor blade 44 or a stator vane 50 of the compressor 20. For example, the airfoil described in the TABLE I below may be placed as a stator vane 50 of the twelfth stage 54l. In use, the rotor blades 44 may rotate circumferentially about the static casing 48 and the stator vanes 50. Rotation of the rotor blades 44 may result in air entering the air intake 34. The air is then subsequently compressed as it traverses the various stages 54 (e.g., first stage 54a to fourteenth stage 54n) of the compressor 20 and moves in the axial direction 38 downstream of the multi-stage axial compressor 20. The compressed air may then exit through an outlet 56 of the multi-stage axial compressor 20. The outlet 56 may have a set of exit guide vanes 58 (EGVs). The compressed air that exits the compressor 20 may be mixed with fuel, directed to the combustor 26, directed to the turbine 22, or elsewhere in the turbine system 10.

Figure 3:
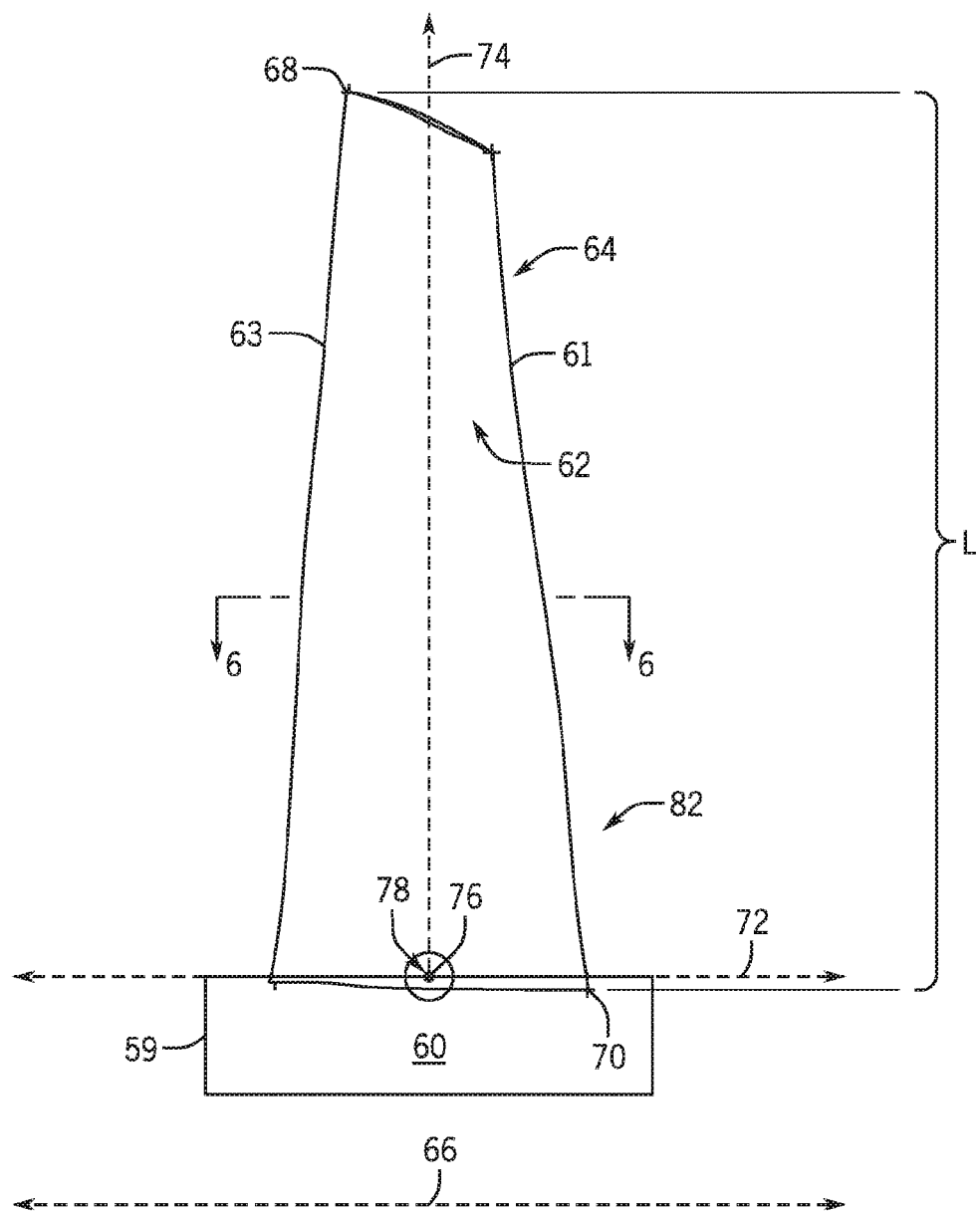
FIG. 3 is side view of an embodiment of an airfoil of a compressor rotor blade or a compressor stator vane.

Certain designs of the rotor blades 44 and stator vanes 50 (e.g., airfoils) provide for a more efficient multi-stage axial compressor 20 system. For example, certain rotor blade and/or stator vane (e.g., airfoil) designs may improve compressor 20 efficiency and enable improved operations for the turbine system 10. Referring now to FIG. 3, the figure is a side view of an embodiment of an airfoil 82 that may be included in the multi-stage axial compressor 20 as a rotor blade 44 or stator vane 50. In the particular embodiment, the airfoil 82 may be included in the twelfth stage 54l of the multi-stage axial compressor 20 as a stator vane 50. In the depicted embodiment, the airfoil 82 is disposed on a base 60, which may, in certain embodiments, be removably coupled as a rotor blade 44 to the rotor assembly 46. That is, the base 60 having the airfoil 82 may be removed from the rotor assembly 46, for example, to inspect, repair, and/or replace the airfoil 82. Additionally, or in the alternative, the airfoil 82 may be removably coupled as a stator vane 50 to the static casing 48. That is, the base 60 having the airfoil 82 may be removed from the static casing 48, for example, to inspect, repair, and/or replace the airfoil 82. The base 60 may include a removable mount or coupling 59, such as a dovetail joint. For example, the coupling 59 may include a T-shaped structure, a hook, one or more lateral protrusions, one or more lateral slots, or any combination thereof. The coupling 59 (e.g., dovetail joint) may be configured to mount into the rotor assembly 46 or the static casing 48 in an axial direction 38, a radial direction 40, and/or a circumferential direction 42 (e.g., into an axial slot or opening, a radial slot or opening, and/or a circumferential slot or opening).

As further described herein, the airfoil 82 includes a suction side 62 and a pressure side 64 disposed opposite from one another on the airfoil 82 (i.e., opposite faces). The airfoil 82 also includes leading and trailing edges 61 and 63 disposed opposite from one another on the airfoil 82 (e.g., opposite upstream and downstream edges). The suction side 62, the pressure side 64, the leading edge 61, and the trailing edge 63 generally extend from the base 60 to a tip 68 of the airfoil 82. The leading and trailing edges, 61 and 63 respectively, may be described as the dividing or intersecting lines between the suction side 62 and the pressure side 64. In other words, the suction side 62 and the pressure sides 64 couple together with one another along the leading edge 61 and the trailing edge 63, thereby defining an airfoil shaped cross-section that gradually changes lengthwise along the airfoil 82. The airfoil profile described in further detail below may be utilized along any portion or the entirety of the airfoil 82 between the base 60 and the tip 68. For example, the portion having the disclosed airfoil profile may include all or part of the suction side 62, all or part of the pressure side 64, or a combination thereof.

In operation, the rotor blades 44 rotate about an axis 66 exerting a torque on a working fluid, such as air, thus increasing energy levels of the fluid as the working fluid traverses the various stages 54 of the multi-stage axial compressor 20 on its way to the combustor 26. The suction side 62 creates and/or increases a suction force on the working fluid, while the pressure side 64 creates and/or increases a pressure bias on the working fluid. The rotor blades 44 may be adjacent (e.g., upstream and/or downstream) to the one or more stationary stator vanes 50. The stator vanes 50 slow the working fluid during rotation of the rotor blades 44, converting a circumferential component of movement of the working fluid flow into pressure. Accordingly, continuous rotation of the rotor blade 44 creates a continuous flow of compressed working fluid, suitable for combustion via the combustor 26.

The airfoil 82 (e.g., rotor blade 44, stator vane 50) includes an airfoil length L measured from the tip 68 of the airfoil 82 to a bottom region 70 of the airfoil 82 adjacent the base 60 (e.g., at an intersection of the airfoil 82 with the base 60). An X axis 72 lies parallel to the base 60 and to the rotational axis 66. The rotational axis 66 may be parallel to the axis 32 or the shaft 30. The X axis 72 is orthogonal to a Z axis 74 which bisects the airfoil 82. A Y axis 76 (shown coming out of the plane of the drawing) is orthogonal to both the X axis 72 and the Z axis 74. The X axis 72 and the Y axis 76 may be used to define an airfoil profile, shape, or section, for example, taken through line 6-6 at a point along the Z axis 74. That is, the airfoil profile may include an outline of the surface (e.g., section) of the airfoil 82 (e.g., rotor blade 44, stator vane 50) at a point along the Z axis 74. The airfoil profile may include X, Y, and Z values for the suction side 62, and X, Y, and Z values for the pressure side 64. A Cartesian coordinate system point 78 (e.g., origin) may be used to define a zero point for the X axis 72, the Z axis 74, and the Y axis 76 of the respective airfoil 82. TABLE I below lists various non-dimensionalized airfoil shapes for the suction side 62 and the corresponding pressure side 64 disposed at locations along the Z axis 74 from the bottom region 70 to the tip 68 of the airfoil 82.

Figure 4:
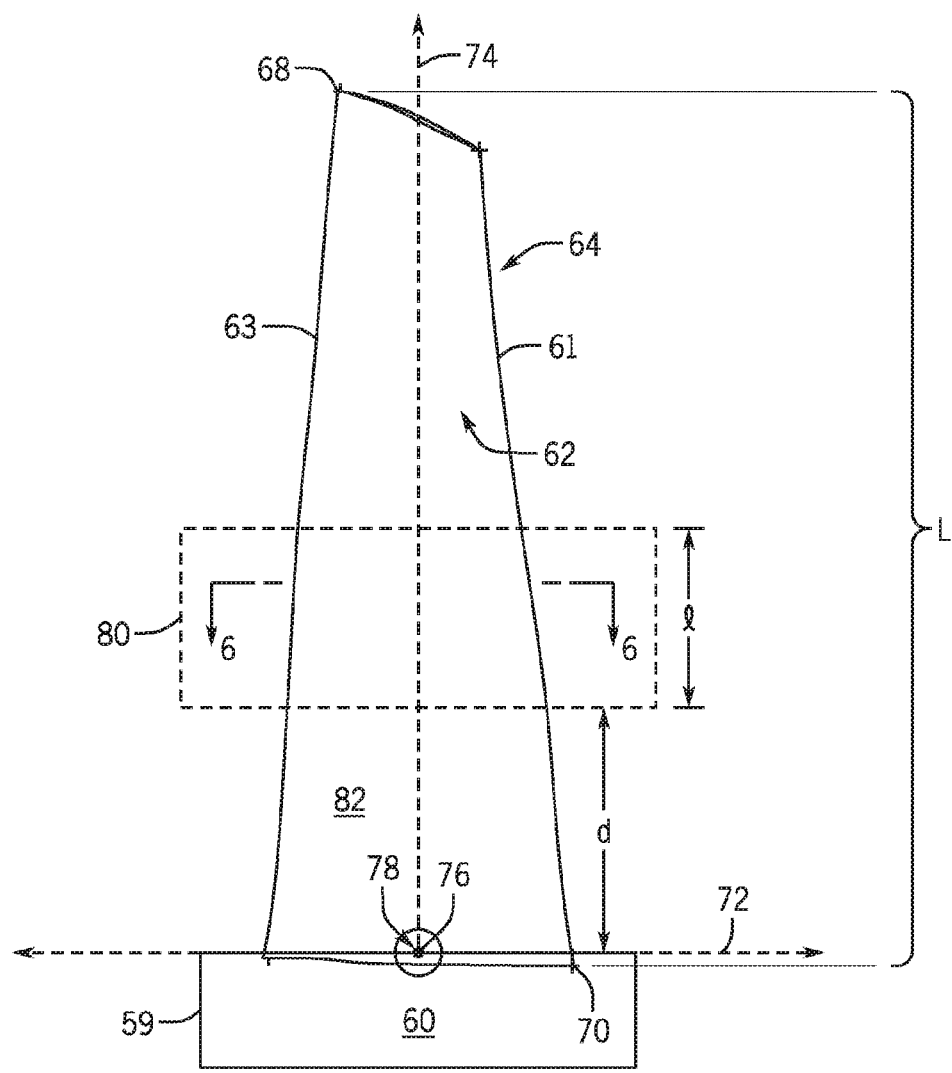
FIG. 4 is side view of an embodiment of an airfoil of a compressor rotor blade or a compressor stator vane.

The airfoil 82 may be described in terms of certain airfoil sections containing various air foil shapes and corresponding rows of the TABLE I. For example, as illustrated in FIG. 4, the airfoil 82 may be described via airfoil shapes disposed on one or more portions 80. In certain embodiments, the portion 80 of the airfoil 82 may be described as an area of interest, an area of greater importance, or a sweet spot, wherein the particular airfoil profile may have a greater impact on the performance, efficiency, and other attributes of the airfoil 82 as compared with other areas of the airfoil 82. However, the portion 80 may include any area of the airfoil 82, regardless of importance. The one or more portions 80 may include a suction side portion of the suction side 62, a pressure side portion of the pressure side 64, or any combination thereof. For example, the one or more portions 80 may include suction side portions 62 and pressure side portions 64 that are offset from one another without any overlap along the Z axis 74, suction side portions 62 and pressure side portions 64 that partially overlap along the Z axis 74, or suction side portions 62 and pressure side portions 64 that completely overlap along the Z axis 74. Portion 80 is shown as a rectangle in dashed lines. More specifically, FIG. 4 is a side view of an embodiment of the airfoil 82 illustrating the portion 80. As described above, the airfoil 82 may be the rotor blade 44 or the stator vane 50, such as the stator vane 50 of the twelfth stage 54l. Because the figure depicts like elements to FIG. 3, the like elements are illustrated with like numbers. In the depicted embodiment, the airfoil 82 includes the length L (e.g., total length), as mentioned previously, measured along the Z axis 74 (e.g., in the radial direction 40) from the tip 68 of the airfoil 82 to the bottom region 70 of the airfoil 82.

The portion 80 may begin at a distance or position d and include a length l extending away from the base 60 in the Z direction along the Z axis 74. As appreciated, in embodiments having one or more suction side portions 80 on the suction side 62 and/or one or more pressure side portions 80 on the pressure side 64, each portion 80 may be defined by a length l and a position d. A zero value of the position d corresponds to the bottom region 70 of the airfoil 82 adjacent the base 60 (e.g., at an intersection of the airfoil 82 with the base 60), which also corresponds to the coordinate origin 78. When d is zero and l is equal to L, the portion 80 includes the entirety of the airfoil 82 from the bottom region 70 to the tip 68 of the airfoil 82. By varying values for d and l, portions 80 having varying lengths and start locations from the coordinate origin 78 may be provided for defining the area of interest (e.g., sweet spot) along the airfoil 82. Each portion 80 may include one or more adjacent airfoil shapes (e.g., airfoil sections or airfoil shapes 110) "stacked" on top of each other along the Z axis 74, described in more detail below with respect to FIG. 6 and TABLE I below. Each airfoil section or airfoil shape 110 corresponds to Cartesian coordinate values of X, Y, and Z for a common Cartesian coordinate value of Z in TABLE I. Furthermore, adjacent airfoil sections or airfoil shapes 110 correspond to the Cartesian coordinate values of X, Y, and Z for adjacent Cartesian coordinate values of Z in the TABLE I.

With reference to TABLE I, the position d may be used to define a start position (e.g., first Cartesian coordinate value of Z) of the portion 80 in the Z direction along the Z axis 74, while a sum of the position d and the length l may be used to define an end position (e.g., last Cartesian coordinate value of Z) of the portion 80 in the Z direction along the Z axis 74. In certain embodiments, the position d (e.g., start position) may be selected directly from one of the Cartesian coordinate values of Z in TABLE I, and the sum of the position d and the length l (e.g., end position) may be selected directly from one of the Cartesian coordinate values of Z in TABLE I. In other embodiments, the desired values of the position d and the length l may be initially selected without referencing TABLE I, and then TABLE I may be subsequently analyzed to select best fits of the Cartesian coordinate values of Z in TABLE I based on the desired values of d and l. For example, with reference to TABLE I, the start position of the portion 80 may correspond to the Cartesian coordinate value of Z equal to or nearest to the value of the position d (e.g., start Z value). If the position d is midway between adjacent Cartesian coordinate values of Z in TABLE I, then the lesser or greater Cartesian coordinate value of Z may be selected for the start position of the portion 80 (e.g., start Z value). Alternatively, in some embodiments, if a specific value of the position d is desired but does not match the specific Cartesian coordinate values of Z in TABLE I, then regression analysis and/or curve fitting may be used to analyze the data in TABLE I and interpolate new Cartesian coordinate values of X, Y, Z to enable use of the desired d value. Similarly, with reference to TABLE I, the end position (e.g., end Z value) may correspond to the Cartesian coordinate value of Z equal to or nearest to the sum of the position d and the length l. If the sum of the position d and the length l is midway between adjacent Cartesian coordinate values of Z in TABLE I, then the lesser or greater Cartesian coordinate value of Z may be selected for the end position (e.g., end Z value). Alternatively, in some embodiments, if a specific value of the length l is desired but the sum of the position d and the length l does not match the specific Cartesian coordinate values of Z in TABLE I, then regression analysis and/or curve fitting may be used to analyze the data in TABLE I and interpolate new Cartesian coordinate values of X, Y, Z to enable use of the desired l value.

In certain embodiments, the portion 80 may be defined by the Cartesian coordinate values of X, Y, and Z corresponding to the start Z value, the end Z value, and all intermediate Z values in TABLE I. However, in some embodiments, if the Z values do not match the desired start and end positions, then the portion 80 may be defined by the Cartesian coordinate values of X, Y, and Z in TABLE I in the Z direction between the start and end positions (e.g., based on the position d and length l). Furthermore, as discussed herein, the portion 80 may include the Cartesian coordinate values of X, Y, and Z for the suction side 62 (e.g., suction side profile 112—see FIG. 6), the pressure side 64 (e.g., pressure side profile—see FIG. 6), or a combination thereof.

In certain embodiments, the portion 80 may include the airfoil profile of TABLE I only for the suction side 62 according to the position d and length l, only for the pressure side 64 according to the position d and length l, or for both the suction and pressure sides 62 and 64 according to the position d and length l. The position d of the portion 80 may be greater than or equal to approximately 0, 5, 10, 15, 20, 25, 30, 35, 40, 45, 50, 55, 60, 65, 70, or 75 percent of the length L of the airfoil 82. Furthermore, the length l of the portion 80 may be greater than or equal to approximately 5, 10, 15, 20, 25, 30, 35, 40, 45, 50, 55, 60, 65, 70, 75, 80, 85, 90, 95, or 100 percent of the length L of the airfoil 82. For example, the portion 80 selected from TABLE I may be the suction side 62 of the outer third of the airfoil 82. In another example, the portion 80 selected from TABLE I may be both the suction side 62 and the pressure side 64 of an interior portion 80 of the airfoil 82, where d is greater than 0 and l is less than L (e.g., l=0.3L).

Figure 5:
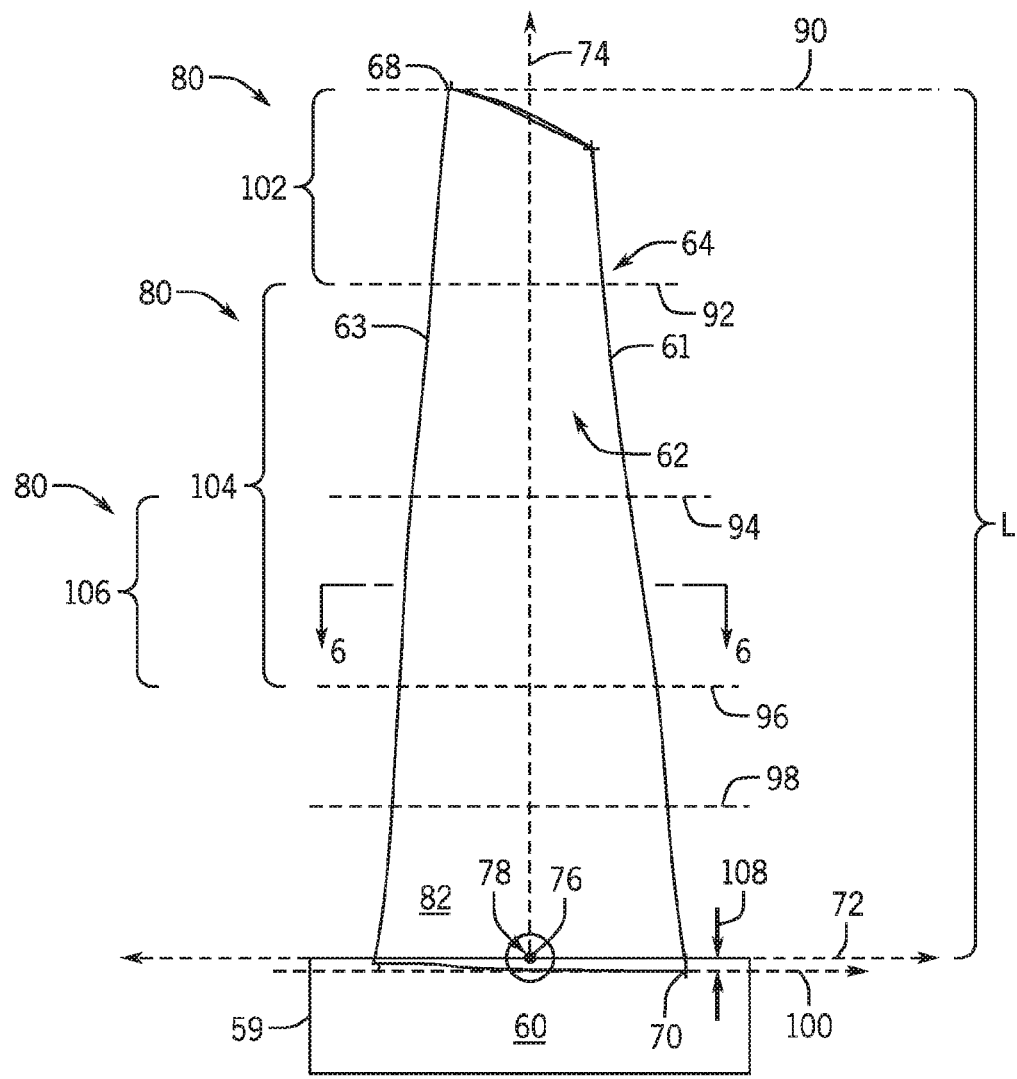
FIG. 5 is a side view of an embodiment of an airfoil of the compressor rotor blade or a compressor stator vane.

Additionally or alternatively, a portion of the airfoil 82, such as portion 80, may be described in terms of a start height (e.g., first position) and a stop height (e.g., second position) along the Z axis 74 (e.g., in the radial direction 40) as illustrated in FIG. 5. Collectively, the start and stop heights (e.g., first and second positions) define a range along the Z axis 74. Again, the portion (e.g., 80) of the airfoil 82 may be described as an area of interest, an area of greater importance, or a sweet spot, wherein the particular airfoil profile may have a greater impact on the performance, efficiency, and other attributes of the airfoil 82 as compared with other areas of the airfoil 82. However, the portion (e.g., 80) may include any area of the airfoil 82, regardless of importance. For example, as shown in FIG. 5, an embodiment of the airfoil 82 is illustrated with multiple defined heights 90, 92, 94, 96, 98, and 100 along the Z axis 74. The heights 90, 92, 94, 96, 98, and 100 may divide the airfoil 82 into a plurality of portions along the Z axis 74, wherein the plurality of portions may have equal lengths along the Z axis 74 (e.g., five portions each being 20 percent of the total length L of the airfoil 82). However, in some embodiments, the plurality of portions defined by the heights 90, 92, 94, 96, 98, and 100 may have different lengths along the Z axis 74. Although the illustrated embodiment includes 6 heights (e.g., 90, 92, 94, 96, 98, and 100) defining 5 portions, certain embodiments may include any number of heights (e.g., 2 to 100 or more) defining any number of portions (e.g., 2 to 100 or more) with equal or different lengths along the Z axis 74.

For example, certain embodiments may include 11 heights to define 10 portions with equal or different lengths along the Z axis 74 (e.g., 10 portions each being 10 percent of the total length L of the airfoil 82). By further example, certain embodiments may include 101 heights to define 100 portions with equal or different lengths along the Z axis 74 (e.g., 100 portions each being 1 percent of the total length L of the airfoil 82). In this manner, the heights may be used to define a specific portion (e.g., 80) of the airfoil 82, wherein the specific portion (e.g., area of interest) may track the airfoil profile described below in TABLE I. Again, similar to the discussion of FIG. 4, the specific portion (e.g., 80) defined by the heights in FIG. 5 may track the airfoil profile of TABLE I along only the suction side 62, only the pressure side 64, or both the suction and pressure sides 62 and 64. Because FIG. 5 depicts like elements to FIG. 4, the like elements are illustrated with like numbers.

In the illustrated embodiment, the portion (e.g., 80) may be defined by the start height and the stop height, wherein the start height is closer to the bottom region 70 than the stop height, and each of the start and stop heights may be selected from one of the heights 90, 92, 94, 96, 98, or 100. Multiple start and stop heights 90, 92, 94, 96, 98, 100 may be defined to divide the airfoil 82 and define the portion (e.g., 80). For example, a first start height 92 and a first stop height 90 may describe a first section or segment 102 (e.g., portion 80) of the airfoil 82, a second start height 96 and a second stop height 92 may describe a second section or segment 104 (e.g., portion 80) of the airfoil 82, and a third start height 96 and a third stop height 94 may describe a third section or segment 106 (e.g., portion 80) of the airfoil 82. As shown in FIG. 5, each height 90, 92, 94, 96, 98, 100 may define a start height for a segment, a stop height for the segment, or a start height for one segment and a stop height for another segment. Each of the heights 90, 92, 94, 96, 98, 100 may be selected to correspond to a different Cartesian coordinate value of Z in TABLE I. In certain embodiments, each of the heights 90, 92, 94, 96, 98, 100 may be selected directly from one of the Cartesian coordinate values of Z in TABLE I. In other embodiments, the desired values of the heights 90, 92, 94, 96, 98, 100 may be initially selected without referencing TABLE I, and then TABLE I may be subsequently analyzed to select best fits of the Cartesian coordinate values of Z in TABLE I based on the desired values of the heights 90, 92, 94, 96, 98, 100. For example, each of the heights 90, 92, 94, 96, 98, 100 may correspond to the Cartesian coordinate value of Z equal to or nearest to the value of the particular height 90, 92, 94, 96, 98, or 100. If the height 90, 92, 94, 96, 98, or 100 is midway between adjacent Cartesian coordinate values of Z in TABLE I, then the lesser or greater Cartesian coordinate value of Z may be selected for the particular height 90, 92, 94, 96, 98, or 100. Alternatively, in some embodiments, if specific heights are desired but do not match the specific Cartesian coordinate values of Z in TABLE I, then regression analysis and/or curve fitting may be used to analyze the data in TABLE I and interpolate new Cartesian coordinate values of X, Y, Z to enable use of the desired heights. In some embodiments, if the Z values do not match the desired heights, then the portion 80 may be defined by the Cartesian coordinate values of X, Y, and Z in TABLE I in the Z direction between the start and stop heights. Furthermore, with reference to TABLE I, the overall height dimension of each segment (e.g., 102, 104, 106) may be equal to an absolute value of the difference between the start and stop heights (e.g., Cartesian coordinate values of Z) for the particular segment. In certain embodiments, an offset or correction value may be used to account for negative values in TABLE I. For example, certain components of the airfoil 82, such as the bottom region 70, may be disposed below the origin point 78 by a distance 108, and thus certain Z values may be negative denoting sections of airfoil 82 below the origin point 78. Accordingly, the offset may be equal to an absolute value of the smallest negative value given in TABLE I.

Figure 6:
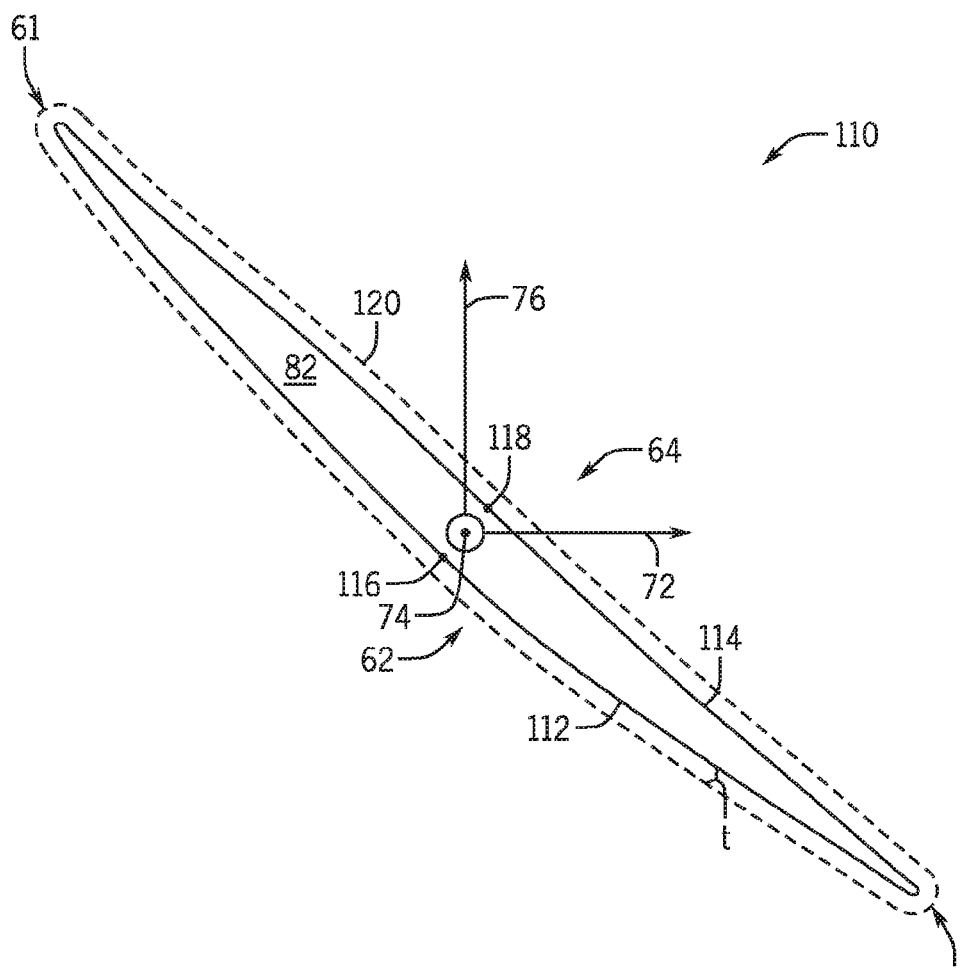
FIG. 6 is an axial view of an embodiment of the airfoil of the compressor rotor blade or compressor stator vane of FIGS. 3-5.

As mentioned earlier with respect to the portion 80 of FIG. 4, the sections 102, 104, and 106 (e.g., portion 80) of FIG. 5 may include one or more airfoil shapes, profiles, or sections, such as an airfoil shape shown in FIG. 6. More specifically, FIG. 6 is a cross-sectional top view depicting an embodiment of an airfoil shape 110 taken through line 6-6 of FIGS. 3, 4, and 5, wherein the airfoil shape 110 may be included, for example, in the portion 80 of the airfoil 82

(e.g., rotor blade 44, stator vane 50). As mentioned earlier, the airfoil 82 may be described in terms of one or more airfoil shapes (e.g., sections) "stacked" on top of each other along the Z axis 74, such as the depicted airfoil shape 110. To define the airfoil shape 110, a unique set or loci of points in space are provided in TABLE I.

A Cartesian coordinate system of X, Y, and Z values given in TABLE I below defines a suction side profile 112 and a pressure side profile 114 of the airfoil shape 110 at various locations along the airfoil 82. For example, point 116 defines a first pair of suction side X and Y values at the Z value of line 6-6 of FIGS. 3-5, while point 118 defines a second pair of pressure side X and Y values at the same Z value of FIGS. 3-5. The X, Y, and Z values of TABLE I are set forth in non-dimensionalized units, and thus a variety of units of dimensions may be used when the values are appropriately scaled by a scale factor F. The scale factor F may be substantially equal to 1, greater than 1, or less than 1. For example, the Cartesian coordinate values of X, Y, and Z may be convertible to dimensional distances by multiplying the X, Y, and Z values by a constant number (e.g., 100). The number, used to convert the non-dimensional values to dimensional distances, may be a fraction (e.g., ½, ¼, etc.), decimal fraction (e.g., 0.5, 1.5, 10.25, etc.), integer (e.g., 1, 2, 10, 100, etc.) or a mixed number (e.g., 1½, 10¼, etc.). The dimensional distances may be any suitable format (e.g., inches, feet, millimeters, centimeters, etc.) These values exclude a coated region or coatings 120 of the airfoil 82. In other words, these values correspond to the bare surface of the airfoil 82. The coated region 120 may include one or more coating layers, surface treatments, or a combination thereof, over the bare surface of the airfoil 82. The Cartesian coordinate system of FIG. 6 utilizes the same orthogonally-related X axis 72, Y axis 76, and Z 74 as the Cartesian coordinate system of FIGS. 3-5 to define locations on the airfoil shape 110 for both the suction side profile 112 and the pressure side profile 114 along the length L of the airfoil 82.

The X axis 72 and the Y axis 76 lie parallel to the base 60, as illustrated in the previous figures. In some embodiments, a positive X coordinate value is axial in the downstream axial direction 38 toward the aft, for example the exhaust outlet 28 of the multi-stage axial compressor 20. In some embodiments, a positive Y coordinate value is directed normal to the X axis 72. A positive Z coordinate value is directed radially from the X axis 72 and the Y axis 76 outward toward tip 68 of the airfoil 82, which is towards the static casing 48 of the multi-stage axial compressor 20 for rotor blades 44, and directed radially inward towards the shaft 30 of the multi-stage axial compressor 20 for stator vanes 50.

By defining X and Y coordinate values at selected locations in a Z direction normal to the X-Y plane, the airfoil shape 110, with its suction side profile 112 and pressure side profile 114, may be defined, for example, by connecting each X and Y coordinate value to adjacent X and Y coordinate values with smooth continuing arcs. The suction side profile 112 is joined to the pressure side profile 114, as shown in FIG. 6, to define the airfoil shape 110. The airfoil shapes 110 (e.g., sections) of the airfoil 82 at various surface locations (e.g., heights) between the Z coordinate values may be determined by smoothly connecting the adjacent (e.g., "stacked") airfoil shapes 110 to one another, thus forming the airfoil 82. It may be appreciated that the airfoil shape 110 of the airfoil 82 may change from the base 60 to the tip 68. For example, adjacent airfoil shapes 110 may taper or expand in one or more directions (e.g., X axis 72, Y axis 76), adjacent airfoil shapes 110 may rotate about an axis (e.g., Z axis 74) in a clockwise direction or a counter-clockwise direction, or any combination thereof. It is also to be noted that TABLE I values represent the Cartesian coordinate values for the airfoil 82 at ambient, non-operating or non-hot conditions. Additionally, TABLE I values represent the Cartesian coordinate values for an uncoated airfoil (i.e., without coatings 120). For a coated airfoil, a thickness t of the coating 120 may be added to each of the X, Y values of TABLE I below.

The X, Y, and Z coordinate values of TABLE I below are non-dimensional values convertible to dimensional distances with the scale factor F. That is, the X, Y, and Z values of TABLE I may be scaled as a function of the same scale factor F (e.g., constant or number) to provide a scaled-up or a scaled-down airfoil. Thus, TABLE I defines the relationships between the X, Y, and Z coordinate values without specifying the units of measure (e.g., dimensional units) for an embodiment of the airfoil 82. Accordingly, while different scale factors F may be applied to the X, Y, and Z coordinate values of TABLE I to define different embodiments of the airfoil 82, each embodiment of the airfoil 82 regardless of the particular scale factor F is considered to be defined by the X, Y, and Z coordinate values of TABLE I. For example, the X, Y, and Z coordinate values of TABLE I define a first embodiment of the airfoil 82 formed with a 1:1 inch scale factor F, a second embodiment of the airfoil 82 formed with a 1:2 inch scale factor F, and a third embodiment of the airfoil 82 formed with a 1:1 cm scale factor F. It may be appreciated that any scale factor F may be used with the X, Y, and Z coordinate values of TABLE I, according to the design considerations of a particular embodiment.

The TABLE I values below are computer-generated and shown to five decimal places. However, certain values in TABLE I may be shown to less than five decimal places (e.g., 0, 1, 2, 3, or 4 decimal places), because the values are rounded to significant figures, the additional decimal places would merely show trailing zeroes, or a combination thereof. Accordingly, in certain embodiments, any values having less than five decimal places may be shown with trailing zeroes out to 1, 2, 3, 4, or 5 decimal places. Furthermore, in some embodiments and in view of manufacturing constraints, actual values useful for forming the airfoil 82 are may be considered valid to fewer (e.g., one, two, three, or four) decimal places for determining the airfoil shape 110 of the airfoil 82. Further, there are typical manufacturing tolerances which may be accounted for in the airfoil shape 110. Accordingly, the X, Y, and Z values given in TABLE I are for the airfoil shape 110 of a nominal airfoil. It will therefore be appreciated that plus or minus typical manufacturing tolerances are applicable to these X, Y, and Z values and that an airfoil 82 having a profile substantially in accordance with those values includes such tolerances. For example, in certain embodiments, a manufacturing tolerance of about ± between 0.001 to 0.20 inches (e.g., between 0.025 to 5 mm) is within design limits for the airfoil 82, and a manufacturing tolerance of about ±0.0008 to 0.1 inches (e.g., 0.02 to 2.5 mm) may be maintained during manufacturing. Accordingly, the values of X and Y carried to three decimal places and having a manufacturing tolerance about ±0.010 inches (0.25 mm) and preferably about ±0.008 inches (0.20 mm) is acceptable to define the airfoil shape 110 of the airfoil 82 at each radial position (e.g., Z coordinate, height) throughout its entire length. As used herein, any reference to Cartesian coordinate values of X, Y, and Z as set forth in TABLE I to a maximum of N decimal places is intended to include: (1) values to N decimal places if shown in TABLE I with N or greater decimal places, and (2) values to less than N decimal places if shown in TABLE I with less than N decimal places, wherein N may be 0, 1, 2, 3, 4, or 5. For example, any reference to Cartesian coordinate values of X, Y, and Z as set forth in TABLE I to a maximum of three (3) decimal places is intended to include: (1) values to three (3) decimal places if shown in TABLE I with three (3) or greater decimal places, and (2) values to less than three (3) decimal places if shown in TABLE I with less than three (3) decimal places (e.g., 0, 1, or 2 decimal places). Furthermore, any reference to Cartesian coordinate values of X, Y, and Z as set forth in TABLE I all carried to N decimal places is intended to include: (1) values to N decimal places if shown in TABLE I with N or greater decimal places, and (2) values with trailing zeros to N decimal places if shown in TABLE I with less than N decimal places, wherein N may be 0, 1, 2, 3, 4, or 5.

As noted previously, the airfoil 82 may also be coated for protection against corrosion, erosion, wear, and oxidation after the airfoil 82 is manufactured, according to the values of TABLE I and within the tolerances explained above. For example, the coating region 120 may include one or more corrosion resistant layers, erosion resistant layers, wear resistant layers, oxidation resistant or anti-oxidation layers, or any combination thereof. An anti-corrosion coating may be provided with an average thickness t of 0.008 inches (0.20 mm), between 0.001 and 0.1 inches (between 0.25 and 2.5 mm), between, 0.0001 and 1 inches or more (between 0.0025 and 2.5 mm or more). For example, in certain embodiments, the coating 120 may increase X and Y values of a suction side in TABLE I by no greater than approximately 3.5 mm along a first suction portion, a first pressure portion, or both. It is to be noted that additional anti-oxidation coatings 120 may be provided, such as overcoats.

TABLE I

| Suction Side or Surface | | | Pressure Side or Surface | | |
|---|---|---|---|---|---|
| X | Y | Z | X | Y | Z |
| −1.35783 | 1.61276 | −0.282 | 1.72894 | −1.72781 | −0.282 |
| −1.36474 | 1.60966 | −0.282 | 1.72922 | −1.72697 | −0.282 |
| −1.37235 | 1.60317 | −0.282 | 1.72979 | −1.72528 | −0.282 |
| −1.37954 | 1.59288 | −0.282 | 1.73078 | −1.72161 | −0.282 |
| −1.38561 | 1.57892 | −0.282 | 1.73204 | −1.71442 | −0.282 |
| −1.39054 | 1.5596 | −0.282 | 1.73247 | −1.703 | −0.282 |
| −1.39379 | 1.53366 | −0.282 | 1.72894 | −1.68269 | −0.282 |
| −1.39421 | 1.50137 | −0.282 | 1.71625 | −1.65844 | −0.282 |
| −1.39167 | 1.46217 | −0.282 | 1.68805 | −1.63532 | −0.282 |
| −1.38674 | 1.41564 | −0.282 | 1.64857 | −1.61093 | −0.282 |
| −1.37969 | 1.3615 | −0.282 | 1.59739 | −1.5792 | −0.282 |
| −1.36939 | 1.29776 | −0.282 | 1.53859 | −1.54226 | −0.282 |
| −1.35557 | 1.22473 | −0.282 | 1.47599 | −1.50236 | −0.282 |
| −1.33781 | 1.14238 | −0.282 | 1.40605 | −1.45695 | −0.282 |
| −1.31483 | 1.05101 | −0.282 | 1.32878 | −1.40577 | −0.282 |
| −1.28592 | 0.9509 | −0.282 | 1.24447 | −1.34838 | −0.282 |
| −1.2518 | 0.84191 | −0.282 | 1.15733 | −1.28733 | −0.282 |
| −1.21246 | 0.72996 | −0.282 | 1.06751 | −1.22233 | −0.282 |
| −1.16663 | 0.61575 | −0.282 | 0.97502 | −1.15324 | −0.282 |
| −1.11573 | 0.49858 | −0.282 | 0.88026 | −1.07992 | −0.282 |
| −1.05835 | 0.37915 | −0.282 | 0.78326 | −1.00181 | −0.282 |
| −0.99349 | 0.25789 | −0.282 | 0.68456 | −0.9189 | −0.282 |
| −0.92172 | 0.13466 | −0.282 | 0.58416 | −0.83077 | −0.282 |
| −0.84233 | 0.00973 | −0.282 | 0.48208 | −0.73757 | −0.282 |
| −0.75788 | −0.11252 | −0.282 | 0.38183 | −0.64226 | −0.282 |
| −0.66919 | −0.23138 | −0.282 | 0.28299 | −0.54525 | −0.282 |
| −0.57659 | −0.34644 | −0.282 | 0.18584 | −0.44641 | −0.282 |
| −0.48011 | −0.45769 | −0.282 | 0.08982 | −0.34601 | −0.282 |
| −0.37915 | −0.56456 | −0.282 | −0.00494 | −0.24449 | −0.282 |
| −0.27368 | −0.66721 | −0.282 | −0.09856 | −0.14213 | −0.282 |
| −0.16398 | −0.76577 | −0.282 | −0.19106 | −0.03878 | −0.282 |
| −0.0502 | −0.86066 | −0.282 | −0.28228 | 0.06571 | −0.282 |

TABLE I-continued

| Suction Side or Surface | | | Pressure Side or Surface | | |
|---|---|---|---|---|---|
| X | Y | Z | X | Y | Z |
| 0.06712 | −0.95189 | −0.282 | −0.37168 | 0.1716 | −0.282 |
| 0.18753 | −1.03889 | −0.282 | −0.45924 | 0.27918 | −0.282 |
| 0.31062 | −1.12194 | −0.282 | −0.54454 | 0.3886 | −0.282 |
| 0.43202 | −1.1985 | −0.282 | −0.62505 | 0.49604 | −0.282 |
| 0.55145 | −1.26914 | −0.282 | −0.70091 | 0.60137 | −0.282 |
| 0.66848 | −1.334 | −0.282 | −0.77198 | 0.7043 | −0.282 |
| 0.78255 | −1.39379 | −0.282 | −0.83853 | 0.80469 | −0.282 |
| 0.89338 | −1.44878 | −0.282 | −0.90127 | 0.90198 | −0.282 |
| 1.00096 | −1.49954 | −0.282 | −0.95951 | 0.99659 | −0.282 |
| 1.10488 | −1.54635 | −0.282 | −1.0145 | 1.08796 | −0.282 |
| 1.20499 | −1.58963 | −0.282 | −1.06399 | 1.17185 | −0.282 |
| 1.2965 | −1.62756 | −0.282 | −1.1077 | 1.24813 | −0.282 |
| 1.3794 | −1.66084 | −0.282 | −1.14619 | 1.31694 | −0.282 |
| 1.45329 | −1.6896 | −0.282 | −1.17975 | 1.37785 | −0.282 |
| 1.5228 | −1.71597 | −0.282 | −1.20865 | 1.43073 | −0.282 |
| 1.58315 | −1.73853 | −0.282 | −1.23319 | 1.47542 | −0.282 |
| 1.62968 | −1.75559 | −0.282 | −1.2542 | 1.51349 | −0.282 |
| 1.66747 | −1.76772 | −0.282 | −1.27281 | 1.54508 | −0.282 |
| 1.69665 | −1.76363 | −0.282 | −1.29001 | 1.56975 | −0.282 |
| 1.71498 | −1.75108 | −0.282 | −1.30552 | 1.58808 | −0.282 |
| 1.7226 | −1.74135 | −0.282 | −1.3192 | 1.60063 | −0.282 |
| 1.7264 | −1.7343 | −0.282 | −1.3309 | 1.60825 | −0.282 |
| 1.72796 | −1.73063 | −0.282 | −1.34162 | 1.61262 | −0.282 |
| 1.72866 | −1.7288 | −0.282 | −1.35092 | 1.61375 | −0.282 |
| −1.40013 | 1.47063 | 0 | 1.78732 | −1.56989 | 0 |
| −1.40633 | 1.46696 | 0 | 1.7876 | −1.56905 | 0 |
| −1.41338 | 1.46034 | 0 | 1.78816 | −1.56736 | 0 |
| −1.41973 | 1.45004 | 0 | 1.78901 | −1.56397 | 0 |
| −1.42466 | 1.43651 | 0 | 1.79042 | −1.55706 | 0 |
| −1.42847 | 1.41761 | 0 | 1.79098 | −1.54592 | 0 |
| −1.42988 | 1.3928 | 0 | 1.78732 | −1.52633 | 0 |
| −1.42805 | 1.36164 | 0 | 1.7742 | −1.5032 | 0 |
| −1.42269 | 1.32441 | 0 | 1.74558 | −1.48247 | 0 |
| −1.41395 | 1.28056 | 0 | 1.70695 | −1.45977 | 0 |
| −1.40253 | 1.22952 | 0 | 1.65689 | −1.43016 | 0 |
| −1.38716 | 1.1696 | 0 | 1.59936 | −1.39576 | 0 |
| −1.36728 | 1.10093 | 0 | 1.53831 | −1.35868 | 0 |
| −1.34288 | 1.02408 | 0 | 1.46978 | −1.31638 | 0 |
| −1.31271 | 0.93948 | 0 | 1.39421 | −1.26858 | 0 |
| −1.27633 | 0.84741 | 0 | 1.31172 | −1.21514 | 0 |
| −1.23389 | 0.74758 | 0 | 1.22642 | −1.15803 | 0 |
| −1.18595 | 0.64536 | 0 | 1.13829 | −1.09726 | 0 |
| −1.13096 | 0.54102 | 0 | 1.04763 | −1.03254 | 0 |
| −1.0709 | 0.434 | 0 | 0.95443 | −0.96388 | 0 |
| −1.0042 | 0.32472 | 0 | 0.85883 | −0.89112 | 0 |
| −0.93046 | 0.21404 | 0 | 0.76112 | −0.81371 | 0 |
| −0.85051 | 0.10279 | 0 | 0.66129 | −0.73193 | 0 |
| −0.76408 | −0.00888 | 0 | 0.55949 | −0.64564 | 0 |
| −0.67412 | −0.11717 | 0 | 0.45881 | −0.5578 | 0 |
| −0.58078 | −0.2225 | 0 | 0.35927 | −0.46854 | 0 |
| −0.48391 | −0.32458 | 0 | 0.26071 | −0.37802 | 0 |
| −0.38352 | −0.42328 | 0 | 0.16314 | −0.28623 | 0 |
| −0.27932 | −0.51846 | 0 | 0.06641 | −0.19373 | 0 |
| −0.17117 | −0.61011 | 0 | −0.02961 | −0.10053 | 0 |
| −0.0595 | −0.69837 | 0 | −0.12507 | −0.00663 | 0 |
| 0.05513 | −0.78311 | 0 | −0.21968 | 0.08798 | 0 |
| 0.17188 | −0.86447 | 0 | −0.31302 | 0.18386 | 0 |
| 0.29102 | −0.94244 | 0 | −0.40481 | 0.28115 | 0 |
| 0.41214 | −1.01717 | 0 | −0.49533 | 0.37985 | 0 |
| 0.53129 | −1.08655 | 0 | −0.58134 | 0.47672 | 0 |
| 0.64775 | −1.15084 | 0 | −0.66298 | 0.57147 | 0 |
| 0.7614 | −1.21034 | 0 | −0.74025 | 0.66397 | 0 |
| 0.87194 | −1.26533 | 0 | −0.81329 | 0.75421 | 0 |
| 0.97939 | −1.31624 | 0 | −0.88266 | 0.84177 | 0 |
| 1.08344 | −1.36305 | 0 | −0.9478 | 0.92679 | 0 |
| 1.18384 | −1.40633 | 0 | −1.00928 | 1.00914 | 0 |
| 1.28056 | −1.44596 | 0 | −1.06497 | 1.08471 | 0 |
| 1.36911 | −1.48064 | 0 | −1.11475 | 1.15352 | 0 |
| 1.4492 | −1.51096 | 0 | −1.15874 | 1.21528 | 0 |
| 1.52054 | −1.53704 | 0 | −1.19751 | 1.26999 | 0 |
| 1.5878 | −1.56087 | 0 | −1.23135 | 1.31722 | 0 |
| 1.64618 | −1.58103 | 0 | −1.26012 | 1.35713 | 0 |
| 1.69115 | −1.5964 | 0 | −1.28507 | 1.39082 | 0 |
| 1.72753 | −1.60754 | 0 | −1.30707 | 1.41832 | 0 |
| 1.75559 | −1.60373 | 0 | −1.32695 | 1.43947 | 0 |
| 1.77336 | −1.59189 | 0 | −1.34472 | 1.4547 | 0 |

TABLE I-continued

| Suction Side or Surface | | | Pressure Side or Surface | | | Suction Side or Surface | | | Pressure Side or Surface | | |
|---|---|---|---|---|---|---|---|---|---|---|---|
| X | Y | Z | X | Y | Z | X | Y | Z | X | Y | Z |
| 1.78097 | −1.58273 | 0 | −1.36023 | 1.46485 | 0 | −1.1875 | 0.6517 | 0.40961 | 1.31948 | −0.96557 | 0.40961 |
| 1.78464 | −1.5761 | 0 | −1.37292 | 1.47049 | 0 | −1.12871 | 0.56174 | 0.40961 | 1.23262 | −0.91058 | 0.40961 |
| 1.78619 | −1.57257 | 0 | −1.3842 | 1.47289 | 0 | −1.0637 | 0.47038 | 0.40961 | 1.14309 | −0.85235 | 0.40961 |
| 1.78689 | −1.57088 | 0 | −1.39336 | 1.4726 | 0 | −0.99377 | 0.37732 | 0.40961 | 1.05059 | −0.79045 | 0.40961 |
| −1.42889 | 1.36291 | 0.24041 | 1.83737 | −1.43566 | 0.24041 | −0.91763 | 0.28299 | 0.40961 | 0.95556 | −0.72502 | 0.40961 |
| −1.43468 | 1.35896 | 0.24041 | 1.83765 | −1.43496 | 0.24041 | −0.83528 | 0.18767 | 0.40961 | 0.85784 | −0.65579 | 0.40961 |
| −1.44102 | 1.35205 | 0.24041 | 1.83822 | −1.43327 | 0.24041 | −0.7466 | 0.09123 | 0.40961 | 0.75773 | −0.58261 | 0.40961 |
| −1.44666 | 1.34176 | 0.24041 | 1.8392 | −1.42988 | 0.24041 | −0.65198 | −0.0055 | 0.40961 | 0.65495 | −0.50563 | 0.40961 |
| −1.45075 | 1.32836 | 0.24041 | 1.84047 | −1.42311 | 0.24041 | −0.55498 | −0.09884 | 0.40961 | 0.55328 | −0.42737 | 0.40961 |
| −1.45329 | 1.30989 | 0.24041 | 1.8409 | −1.4124 | 0.24041 | −0.45543 | −0.18908 | 0.40961 | 0.45233 | −0.34785 | 0.40961 |
| −1.45329 | 1.28578 | 0.24041 | 1.83723 | −1.39336 | 0.24041 | −0.35349 | −0.27608 | 0.40961 | 0.35208 | −0.26748 | 0.40961 |
| −1.44976 | 1.25589 | 0.24041 | 1.82355 | −1.37137 | 0.24041 | −0.24872 | −0.35955 | 0.40961 | 0.25239 | −0.18626 | 0.40961 |
| −1.44229 | 1.21993 | 0.24041 | 1.79493 | −1.35205 | 0.24041 | −0.14142 | −0.4395 | 0.40961 | 0.15341 | −0.10434 | 0.40961 |
| −1.43087 | 1.17806 | 0.24041 | 1.757 | −1.33076 | 0.24041 | −0.03144 | −0.51606 | 0.40961 | 0.05457 | −0.02214 | 0.40961 |
| −1.41578 | 1.12955 | 0.24041 | 1.70779 | −1.30284 | 0.24041 | 0.08065 | −0.5898 | 0.40961 | −0.04385 | 0.06035 | 0.40961 |
| −1.39632 | 1.07287 | 0.24041 | 1.65111 | −1.27041 | 0.24041 | 0.19472 | −0.66101 | 0.40961 | −0.14185 | 0.1434 | 0.40961 |
| −1.37165 | 1.00815 | 0.24041 | 1.5909 | −1.2353 | 0.24041 | 0.31076 | −0.72953 | 0.40961 | −0.23928 | 0.22715 | 0.40961 |
| −1.34147 | 0.93554 | 0.24041 | 1.52336 | −1.1954 | 0.24041 | 0.4285 | −0.79595 | 0.40961 | −0.33572 | 0.31203 | 0.40961 |
| −1.3051 | 0.85601 | 0.24041 | 1.44892 | −1.15042 | 0.24041 | 0.54764 | −0.85982 | 0.40961 | −0.43146 | 0.3979 | 0.40961 |
| −1.26209 | 0.77 | 0.24041 | 1.36756 | −1.0998 | 0.24041 | 0.66397 | −0.91932 | 0.40961 | −0.52311 | 0.4818 | 0.40961 |
| −1.2126 | 0.67722 | 0.24041 | 1.28324 | −1.04594 | 0.24041 | 0.77719 | −0.97473 | 0.40961 | −0.61081 | 0.56372 | 0.40961 |
| −1.15733 | 0.58247 | 0.24041 | 1.1961 | −0.98869 | 0.24041 | 0.88745 | −1.02634 | 0.40961 | −0.69457 | 0.64352 | 0.40961 |
| −1.09571 | 0.48659 | 0.24041 | 1.10629 | −0.92792 | 0.24041 | 0.99447 | −1.07428 | 0.40961 | −0.77451 | 0.72107 | 0.40961 |
| −1.02888 | 0.38831 | 0.24041 | 1.01365 | −0.86334 | 0.24041 | 1.09797 | −1.11884 | 0.40961 | −0.85094 | 0.79623 | 0.40961 |
| −0.95584 | 0.28877 | 0.24041 | 0.91862 | −0.79496 | 0.24041 | 1.19794 | −1.16001 | 0.40961 | −0.92355 | 0.86912 | 0.40961 |
| −0.87603 | 0.18781 | 0.24041 | 0.82104 | −0.72248 | 0.24041 | 1.29438 | −1.19822 | 0.40961 | −0.99264 | 0.93934 | 0.40961 |
| −0.79002 | 0.08587 | 0.24041 | 0.72107 | −0.64606 | 0.24041 | 1.38716 | −1.23333 | 0.40961 | −1.05567 | 1.00364 | 0.40961 |
| −0.69781 | −0.01622 | 0.24041 | 0.61885 | −0.56541 | 0.24041 | 1.4719 | −1.26421 | 0.40961 | −1.11249 | 1.06201 | 0.40961 |
| −0.60292 | −0.11506 | 0.24041 | 0.51747 | −0.48335 | 0.24041 | 1.54846 | −1.291 | 0.40961 | −1.16325 | 1.11418 | 0.40961 |
| −0.5052 | −0.21065 | 0.24041 | 0.41722 | −0.40016 | 0.24041 | 1.61685 | −1.31398 | 0.40961 | −1.20823 | 1.16015 | 0.40961 |
| −0.40481 | −0.30301 | 0.24041 | 0.31767 | −0.3157 | 0.24041 | 1.681 | −1.33513 | 0.40961 | −1.24743 | 1.19977 | 0.40961 |
| −0.30132 | −0.39198 | 0.24041 | 0.21883 | −0.23054 | 0.24041 | 1.73684 | −1.35304 | 0.40961 | −1.28099 | 1.23276 | 0.40961 |
| −0.19486 | −0.47729 | 0.24041 | 0.12056 | −0.14467 | 0.24041 | 1.77984 | −1.36657 | 0.40961 | −1.31031 | 1.2604 | 0.40961 |
| −0.08545 | −0.55935 | 0.24041 | 0.02284 | −0.05837 | 0.24041 | 1.81453 | −1.3763 | 0.40961 | −1.33626 | 1.28225 | 0.40961 |
| 0.02637 | −0.63831 | 0.24041 | −0.07473 | 0.0282 | 0.24041 | 1.8409 | −1.37249 | 0.40961 | −1.35896 | 1.29833 | 0.40961 |
| 0.14072 | −0.71445 | 0.24041 | −0.1716 | 0.11562 | 0.24041 | 1.85768 | −1.36136 | 0.40961 | −1.37842 | 1.30904 | 0.40961 |
| 0.25733 | −0.78805 | 0.24041 | −0.26762 | 0.20375 | 0.24041 | 1.86473 | −1.35275 | 0.40961 | −1.39435 | 1.31525 | 0.40961 |
| 0.37562 | −0.85883 | 0.24041 | −0.36279 | 0.293 | 0.24041 | 1.86839 | −1.34655 | 0.40961 | −1.40704 | 1.31793 | 0.40961 |
| 0.49547 | −0.92693 | 0.24041 | −0.4567 | 0.38352 | 0.24041 | 1.86994 | −1.34317 | 0.40961 | −1.41761 | 1.31807 | 0.40961 |
| 0.61265 | −0.99038 | 0.24041 | −0.54666 | 0.47207 | 0.24041 | 1.87051 | −1.34162 | 0.40961 | −1.42607 | 1.31624 | 0.40961 |
| 0.72714 | −1.04918 | 0.24041 | −0.63253 | 0.5585 | 0.24041 | −1.42058 | 1.28648 | 0.59333 | 1.89758 | −1.23389 | 0.59333 |
| 0.83867 | −1.10389 | 0.24041 | −0.71431 | 0.64282 | 0.24041 | −1.42579 | 1.28225 | 0.59333 | 1.89786 | −1.23305 | 0.59333 |
| 0.94682 | −1.15465 | 0.24041 | −0.79214 | 0.72488 | 0.24041 | −1.43129 | 1.27506 | 0.59333 | 1.89828 | −1.23149 | 0.59333 |
| 1.05172 | −1.2016 | 0.24041 | −0.8663 | 0.80441 | 0.24041 | −1.43594 | 1.26477 | 0.59333 | 1.89927 | −1.22811 | 0.59333 |
| 1.15324 | −1.24517 | 0.24041 | −0.93666 | 0.88153 | 0.24041 | −1.43905 | 1.25166 | 0.59333 | 1.9004 | −1.22134 | 0.59333 |
| 1.25109 | −1.28522 | 0.24041 | −1.0035 | 0.95612 | 0.24041 | −1.44017 | 1.23361 | 0.59333 | 1.90068 | −1.21063 | 0.59333 |
| 1.34514 | −1.3223 | 0.24041 | −1.06413 | 1.02451 | 0.24041 | −1.43834 | 1.21049 | 0.59333 | 1.89589 | −1.19201 | 0.59333 |
| 1.43129 | −1.35459 | 0.24041 | −1.11869 | 1.08655 | 0.24041 | −1.4327 | 1.182 | 0.59333 | 1.88066 | −1.17143 | 0.59333 |
| 1.50912 | −1.38265 | 0.24041 | −1.16734 | 1.14238 | 0.24041 | −1.42283 | 1.14802 | 0.59333 | 1.85147 | −1.15465 | 0.59333 |
| 1.57864 | −1.4069 | 0.24041 | −1.2104 | 1.19145 | 0.24041 | −1.40845 | 1.10882 | 0.59333 | 1.81411 | −1.13505 | 0.59333 |
| 1.64406 | −1.42889 | 0.24041 | −1.24785 | 1.23375 | 0.24041 | −1.3897 | 1.0637 | 0.59333 | 1.76574 | −1.10939 | 0.59333 |
| 1.70074 | −1.44765 | 0.24041 | −1.27986 | 1.26928 | 0.24041 | −1.36601 | 1.01097 | 0.59333 | 1.71005 | −1.0795 | 0.59333 |
| 1.74459 | −1.46189 | 0.24041 | −1.30778 | 1.29917 | 0.24041 | −1.33654 | 0.95119 | 0.59333 | 1.65083 | −1.04735 | 0.59333 |
| 1.77984 | −1.47204 | 0.24041 | −1.33231 | 1.323 | 0.24041 | −1.30101 | 0.88435 | 0.59333 | 1.58456 | −1.01069 | 0.59333 |
| 1.80677 | −1.46823 | 0.24041 | −1.35416 | 1.34105 | 0.24041 | −1.25899 | 0.81146 | 0.59333 | 1.51124 | −0.96923 | 0.59333 |
| 1.82384 | −1.45681 | 0.24041 | −1.3732 | 1.35374 | 0.24041 | −1.21006 | 0.73264 | 0.59333 | 1.43101 | −0.92285 | 0.59333 |
| 1.83117 | −1.44807 | 0.24041 | −1.38941 | 1.36164 | 0.24041 | −1.15423 | 0.64804 | 0.59333 | 1.34782 | −0.8735 | 0.59333 |
| 1.83483 | −1.44173 | 0.24041 | −1.40239 | 1.36559 | 0.24041 | −1.09303 | 0.56203 | 0.59333 | 1.26153 | −0.82118 | 0.59333 |
| 1.83638 | −1.43834 | 0.24041 | −1.41353 | 1.36657 | 0.24041 | −1.02606 | 0.47503 | 0.59333 | 1.17242 | −0.76549 | 0.59333 |
| 1.83709 | −1.43665 | 0.24041 | −1.42255 | 1.3653 | 0.24041 | −0.95401 | 0.38634 | 0.59333 | 1.08034 | −0.70655 | 0.59333 |
| −1.432 | 1.31356 | 0.40961 | 1.87093 | −1.34077 | 0.40961 | −0.87617 | 0.29666 | 0.59333 | 0.98559 | −0.64409 | 0.59333 |
| −1.4375 | 1.30947 | 0.40961 | 1.87121 | −1.33992 | 0.40961 | −0.79228 | 0.20614 | 0.59333 | 0.88802 | −0.57824 | 0.59333 |
| −1.44342 | 1.30228 | 0.40961 | 1.87163 | −1.33823 | 0.40961 | −0.70232 | 0.11463 | 0.59333 | 0.78777 | −0.50873 | 0.59333 |
| −1.44849 | 1.29198 | 0.40961 | 1.87262 | −1.33499 | 0.40961 | −0.60644 | 0.0227 | 0.59333 | 0.68498 | −0.43541 | 0.59333 |
| −1.45216 | 1.27873 | 0.40961 | 1.87389 | −1.32836 | 0.40961 | −0.50831 | −0.06585 | 0.59333 | 0.58289 | −0.36082 | 0.59333 |
| −1.45399 | 1.26054 | 0.40961 | 1.87431 | −1.31779 | 0.40961 | −0.40791 | −0.15143 | 0.59333 | 0.4818 | −0.28524 | 0.59333 |
| −1.45301 | 1.23685 | 0.40961 | 1.87022 | −1.29903 | 0.40961 | −0.30527 | −0.23364 | 0.59333 | 0.38126 | −0.20882 | 0.59333 |
| −1.44835 | 1.20767 | 0.40961 | 1.85641 | −1.27788 | 0.40961 | −0.20022 | −0.31232 | 0.59333 | 0.28144 | −0.13155 | 0.59333 |
| −1.43961 | 1.1727 | 0.40961 | 1.82764 | −1.25955 | 0.40961 | −0.09264 | −0.38747 | 0.59333 | 0.18203 | −0.05372 | 0.59333 |
| −1.4265 | 1.13209 | 0.40961 | 1.79 | −1.23911 | 0.40961 | 0.0172 | −0.45938 | 0.59333 | 0.08291 | 0.02453 | 0.59333 |
| −1.40944 | 1.08528 | 0.40961 | 1.74121 | −1.21218 | 0.40961 | 0.12902 | −0.52847 | 0.59333 | −0.01593 | 0.10321 | 0.59333 |
| −1.38758 | 1.03057 | 0.40961 | 1.68495 | −1.18102 | 0.40961 | 0.24252 | −0.59502 | 0.59333 | −0.11449 | 0.18217 | 0.59333 |
| −1.36009 | 0.96839 | 0.40961 | 1.62517 | −1.14746 | 0.40961 | 0.35786 | −0.65918 | 0.59333 | −0.21235 | 0.26184 | 0.59333 |
| −1.32695 | 0.89873 | 0.40961 | 1.55819 | −1.10911 | 0.40961 | 0.47461 | −0.72122 | 0.59333 | −0.30964 | 0.34249 | 0.59333 |
| −1.28719 | 0.82259 | 0.40961 | 1.48417 | −1.06568 | 0.40961 | 0.59276 | −0.781 | 0.59333 | −0.40594 | 0.42413 | 0.59333 |
| −1.24066 | 0.74025 | 0.40961 | 1.40337 | −1.01717 | 0.40961 | 0.7081 | −0.83669 | 0.59333 | −0.49844 | 0.50379 | 0.59333 |

TABLE I-continued

| Suction Side or Surface | | | Pressure Side or Surface | | | Suction Side or Surface | | | Pressure Side or Surface | | |
|---|---|---|---|---|---|---|---|---|---|---|---|
| X | Y | Z | X | Y | Z | X | Y | Z | X | Y | Z |
| 0.82034 | −0.88872 | 0.59333 | −0.58698 | 0.58163 | 0.59333 | −1.35318 | 1.33245 | 1.31299 | 1.9176 | −0.8577 | 1.31299 |
| 0.92933 | −0.93709 | 0.59333 | −0.67172 | 0.65734 | 0.59333 | −1.35783 | 1.32794 | 1.31299 | 1.91774 | −0.85686 | 1.31299 |
| 1.03494 | −0.98221 | 0.59333 | −0.75266 | 0.73094 | 0.59333 | −1.3622 | 1.32075 | 1.31299 | 1.91831 | −0.85531 | 1.31299 |
| 1.13702 | −1.02394 | 0.59333 | −0.83007 | 0.80229 | 0.59333 | −1.36544 | 1.3106 | 1.31299 | 1.91915 | −0.8522 | 1.31299 |
| 1.23572 | −1.06286 | 0.59333 | −0.90381 | 0.87138 | 0.59333 | −1.36685 | 1.29805 | 1.31299 | 1.92 | −0.846 | 1.31299 |
| 1.33062 | −1.09895 | 0.59333 | −0.97417 | 0.93793 | 0.59333 | −1.36601 | 1.28113 | 1.31299 | 1.91957 | −0.83599 | 1.31299 |
| 1.42199 | −1.13223 | 0.59333 | −1.03818 | 0.9987 | 0.59333 | −1.3622 | 1.25969 | 1.31299 | 1.91309 | −0.81949 | 1.31299 |
| 1.50532 | −1.16142 | 0.59333 | −1.09613 | 1.05398 | 0.59333 | −1.35445 | 1.23361 | 1.31299 | 1.8956 | −0.80398 | 1.31299 |
| 1.58061 | −1.1868 | 0.59333 | −1.14802 | 1.10318 | 0.59333 | −1.34232 | 1.20259 | 1.31299 | 1.86684 | −0.79031 | 1.31299 |
| 1.64787 | −1.20879 | 0.59333 | −1.19399 | 1.14661 | 0.59333 | −1.3254 | 1.1672 | 1.31299 | 1.83089 | −0.7731 | 1.31299 |
| 1.71104 | −1.22882 | 0.59333 | −1.23417 | 1.1837 | 0.59333 | −1.30369 | 1.12687 | 1.31299 | 1.78436 | −0.75068 | 1.31299 |
| 1.76588 | −1.24588 | 0.59333 | −1.26858 | 1.21472 | 0.59333 | −1.27661 | 1.07992 | 1.31299 | 1.73078 | −0.72446 | 1.31299 |
| 1.80804 | −1.25871 | 0.59333 | −1.29861 | 1.24038 | 0.59333 | −1.24362 | 1.02676 | 1.31299 | 1.67367 | −0.69626 | 1.31299 |
| 1.84217 | −1.26815 | 0.59333 | −1.32512 | 1.26054 | 0.59333 | −1.20442 | 0.96754 | 1.31299 | 1.6098 | −0.66425 | 1.31299 |
| 1.86797 | −1.26477 | 0.59333 | −1.34824 | 1.27506 | 0.59333 | −1.15888 | 0.90282 | 1.31299 | 1.53887 | −0.62816 | 1.31299 |
| 1.88447 | −1.25405 | 0.59333 | −1.36784 | 1.28479 | 0.59333 | −1.10657 | 0.83317 | 1.31299 | 1.46118 | −0.58797 | 1.31299 |
| 1.89152 | −1.24559 | 0.59333 | −1.38377 | 1.2900 | 0.59333 | −1.04749 | 0.75858 | 1.31299 | 1.38025 | −0.54539 | 1.31299 |
| 1.89504 | −1.23967 | 0.59333 | −1.39632 | 1.29198 | 0.59333 | −0.98348 | 0.68286 | 1.31299 | 1.29635 | −0.50013 | 1.31299 |
| 1.89659 | −1.23643 | 0.59333 | −1.40676 | 1.29156 | 0.59333 | −0.91467 | 0.60602 | 1.31299 | 1.20936 | −0.45219 | 1.31299 |
| 1.89716 | −1.23474 | 0.59333 | −1.41494 | 1.28945 | 0.59333 | −0.84107 | 0.52819 | 1.31299 | 1.1194 | −0.40157 | 1.31299 |
| −1.39054 | 1.28493 | 0.88252 | 1.91732 | −1.06582 | 0.88252 | −0.76225 | 0.44951 | 1.31299 | 1.02648 | −0.34785 | 1.31299 |
| −1.39548 | 1.28056 | 0.88252 | 1.9176 | −1.06497 | 0.88252 | −0.67807 | 0.37027 | 1.31299 | 0.93074 | −0.29117 | 1.31299 |
| −1.40041 | 1.27323 | 0.88252 | 1.91802 | −1.06342 | 0.88252 | −0.58839 | 0.2906 | 1.31299 | 0.83218 | −0.23138 | 1.31299 |
| −1.40436 | 1.26308 | 0.88252 | 1.91887 | −1.06018 | 0.88252 | −0.49294 | 0.21065 | 1.31299 | 0.73094 | −0.16835 | 1.31299 |
| −1.40662 | 1.25011 | 0.88252 | 1.92 | −1.05355 | 0.88252 | −0.39522 | 0.13325 | 1.31299 | 0.63041 | −0.10434 | 1.31299 |
| −1.4069 | 1.23262 | 0.88252 | 1.92 | −1.04312 | 0.88252 | −0.29568 | 0.05866 | 1.31299 | 0.5303 | −0.0392 | 1.31299 |
| −1.40394 | 1.2102 | 0.88252 | 1.91464 | −1.02521 | 0.88252 | −0.19444 | −0.01269 | 1.31299 | 0.43104 | 0.02679 | 1.31299 |
| −1.39731 | 1.18285 | 0.88252 | 1.89828 | −1.00646 | 0.88252 | −0.09137 | −0.08065 | 1.31299 | 0.3322 | 0.09348 | 1.31299 |
| −1.38617 | 1.15042 | 0.88252 | 1.8691 | −0.99137 | 0.88252 | 0.01368 | −0.14523 | 1.31299 | 0.23392 | 0.16102 | 1.31299 |
| −1.37038 | 1.11305 | 0.88252 | 1.83244 | −0.97304 | 0.88252 | 0.12041 | −0.20671 | 1.31299 | 0.13592 | 0.22898 | 1.31299 |
| −1.35008 | 1.07019 | 0.88252 | 1.78492 | −0.94893 | 0.88252 | 0.2287 | −0.26522 | 1.31299 | 0.03807 | 0.29709 | 1.31299 |
| −1.32455 | 1.02028 | 0.88252 | 1.73021 | −0.92087 | 0.88252 | 0.3384 | −0.32134 | 1.31299 | −0.05964 | 0.36561 | 1.31299 |
| −1.29311 | 0.96374 | 0.88252 | 1.67184 | −0.8907 | 0.88252 | 0.44937 | −0.37492 | 1.31299 | −0.15665 | 0.43499 | 1.31299 |
| −1.25546 | 0.90071 | 0.88252 | 1.60655 | −0.85629 | 0.88252 | 0.5616 | −0.42653 | 1.31299 | −0.2531 | 0.5052 | 1.31299 |
| −1.21147 | 0.83176 | 0.88252 | 1.53436 | −0.81752 | 0.88252 | 0.67483 | −0.47602 | 1.31299 | −0.34855 | 0.57669 | 1.31299 |
| −1.16057 | 0.75745 | 0.88252 | 1.45526 | −0.77423 | 0.88252 | 0.78537 | −0.52226 | 1.31299 | −0.44006 | 0.64663 | 1.31299 |
| −1.10276 | 0.67779 | 0.88252 | 1.37306 | −0.72812 | 0.88252 | 0.89281 | −0.56527 | 1.31299 | −0.52776 | 0.71515 | 1.31299 |
| −1.03988 | 0.59699 | 0.88252 | 1.28775 | −0.6792 | 0.88252 | 0.99715 | −0.60531 | 1.31299 | −0.61166 | 0.78199 | 1.31299 |
| −0.97149 | 0.51521 | 0.88252 | 1.19949 | −0.62731 | 0.88252 | 1.09811 | −0.64254 | 1.31299 | −0.69203 | 0.84713 | 1.31299 |
| −0.89817 | 0.43202 | 0.88252 | 1.10812 | −0.57232 | 0.88252 | 1.19568 | −0.67708 | 1.31299 | −0.76873 | 0.9103 | 1.31299 |
| −0.81935 | 0.34785 | 0.88252 | 1.01393 | −0.51423 | 0.88252 | 1.28973 | −0.70923 | 1.31299 | −0.84191 | 0.97149 | 1.31299 |
| −0.73475 | 0.26297 | 0.88252 | 0.91692 | −0.45289 | 0.88252 | 1.38011 | −0.73912 | 1.31299 | −0.91185 | 1.03043 | 1.31299 |
| −0.64437 | 0.17752 | 0.88252 | 0.81724 | −0.38817 | 0.88252 | 1.46682 | −0.7669 | 1.31299 | −0.97558 | 1.08429 | 1.31299 |
| −0.54821 | 0.09165 | 0.88252 | 0.71487 | −0.32007 | 0.88252 | 1.54592 | −0.79143 | 1.31299 | −1.03325 | 1.13322 | 1.31299 |
| −0.44979 | 0.00888 | 0.88252 | 0.61321 | −0.25084 | 0.88252 | 1.61727 | −0.81301 | 1.31299 | −1.085 | 1.17679 | 1.31299 |
| −0.34954 | −0.07092 | 0.88252 | 0.51239 | −0.18062 | 0.88252 | 1.68072 | −0.83176 | 1.31299 | −1.13082 | 1.215 | 1.31299 |
| −0.24717 | −0.14749 | 0.88252 | 0.41228 | −0.10956 | 0.88252 | 1.7405 | −0.84896 | 1.31299 | −1.17072 | 1.24771 | 1.31299 |
| −0.14269 | −0.22052 | 0.88252 | 0.3126 | −0.03751 | 0.88252 | 1.79225 | −0.86377 | 1.31299 | −1.20499 | 1.27478 | 1.31299 |
| −0.03596 | −0.29004 | 0.88252 | 0.21347 | 0.03511 | 0.88252 | 1.83201 | −0.87491 | 1.31299 | −1.23516 | 1.29692 | 1.31299 |
| 0.07276 | −0.35645 | 0.88252 | 0.11477 | 0.10815 | 0.88252 | 1.86402 | −0.88379 | 1.31299 | −1.26167 | 1.31384 | 1.31299 |
| 0.1833 | −0.42004 | 0.88252 | 0.01622 | 0.18161 | 0.88252 | 1.88841 | −0.88449 | 1.31299 | −1.28437 | 1.32596 | 1.31299 |
| 0.2954 | −0.48095 | 0.88252 | −0.0822 | 0.25521 | 0.88252 | 1.90477 | −0.87603 | 1.31299 | −1.3034 | 1.33386 | 1.31299 |
| 0.40904 | −0.53961 | 0.88252 | −0.18006 | 0.32966 | 0.88252 | 1.91182 | −0.86856 | 1.31299 | −1.31877 | 1.33781 | 1.31299 |
| 0.52396 | −0.59615 | 0.88252 | −0.27721 | 0.40495 | 0.88252 | 1.9152 | −0.86292 | 1.31299 | −1.33076 | 1.33908 | 1.31299 |
| 0.64028 | −0.65072 | 0.88252 | −0.37365 | 0.48123 | 0.88252 | 1.91661 | −0.85996 | 1.31299 | −1.34063 | 1.33809 | 1.31299 |
| 0.75365 | −0.70148 | 0.88252 | −0.46615 | 0.55596 | 0.88252 | 1.91732 | −0.85841 | 1.31299 | −1.3481 | 1.33555 | 1.31299 |
| 0.86391 | −0.74885 | 0.88252 | −0.55484 | 0.62872 | 0.88252 | −1.33273 | 1.38265 | 1.74361 | 1.88489 | −0.72671 | 1.74361 |
| 0.97079 | −0.79284 | 0.88252 | −0.63972 | 0.69978 | 0.88252 | −1.3371 | 1.37813 | 1.74361 | 1.88517 | −0.72601 | 1.74361 |
| 1.07442 | −0.83387 | 0.88252 | −0.72079 | 0.76887 | 0.88252 | −1.34119 | 1.37094 | 1.74361 | 1.88573 | −0.72446 | 1.74361 |
| 1.17453 | −0.87209 | 0.88252 | −0.79848 | 0.83571 | 0.88252 | −1.34373 | 1.36093 | 1.74361 | 1.88644 | −0.7215 | 1.74361 |
| 1.27112 | −0.90748 | 0.88252 | −0.87251 | 0.90043 | 0.88252 | −1.34458 | 1.34867 | 1.74361 | 1.88714 | −0.71529 | 1.74361 |
| 1.36403 | −0.94047 | 0.88252 | −0.94315 | 0.96289 | 0.88252 | −1.34303 | 1.33231 | 1.74361 | 1.88616 | −0.70571 | 1.74361 |
| 1.45329 | −0.97093 | 0.88252 | −1.00745 | 1.02014 | 0.88252 | −1.33851 | 1.31158 | 1.74361 | 1.87826 | −0.6902 | 1.74361 |
| 1.53464 | −0.99772 | 0.88252 | −1.06568 | 1.07174 | 0.88252 | −1.33005 | 1.28634 | 1.74361 | 1.85909 | −0.67751 | 1.74361 |
| 1.60811 | −1.02126 | 0.88252 | −1.11799 | 1.11799 | 0.88252 | −1.31736 | 1.25673 | 1.74361 | 1.83089 | −0.66453 | 1.74361 |
| 1.67367 | −1.04157 | 0.88252 | −1.16424 | 1.15846 | 0.88252 | −1.30002 | 1.22261 | 1.74361 | 1.79564 | −0.64818 | 1.74361 |
| 1.73515 | −1.06018 | 0.88252 | −1.2047 | 1.193 | 0.88252 | −1.27774 | 1.18398 | 1.74361 | 1.74981 | −0.62675 | 1.74361 |
| 1.78859 | −1.07611 | 0.88252 | −1.23939 | 1.22191 | 0.88252 | −1.24997 | 1.13928 | 1.74361 | 1.69708 | −0.60179 | 1.74361 |
| 1.82976 | −1.0881 | 0.88252 | −1.26985 | 1.24545 | 0.88252 | −1.21641 | 1.08838 | 1.74361 | 1.6411 | −0.57486 | 1.74361 |
| 1.86275 | −1.09726 | 0.88252 | −1.2965 | 1.26378 | 0.88252 | −1.17693 | 1.03184 | 1.74361 | 1.57807 | −0.5444 | 1.74361 |
| 1.88813 | −1.09515 | 0.88252 | −1.31962 | 1.2769 | 0.88252 | −1.1311 | 0.96994 | 1.74361 | 1.50842 | −0.51 | 1.74361 |
| 1.90435 | −1.08528 | 0.88252 | −1.33908 | 1.28536 | 0.88252 | −1.07865 | 0.90339 | 1.74361 | 1.432 | −0.47179 | 1.74361 |
| 1.9114 | −1.07724 | 0.88252 | −1.35487 | 1.28987 | 0.88252 | −1.01943 | 0.83204 | 1.74361 | 1.35233 | −0.43118 | 1.74361 |
| 1.91492 | −1.07132 | 0.88252 | −1.36714 | 1.29128 | 0.88252 | −0.9557 | 0.75971 | 1.74361 | 1.26971 | −0.38817 | 1.74361 |
| 1.91633 | −1.06822 | 0.88252 | −1.37729 | 1.29043 | 0.88252 | −0.88731 | 0.68611 | 1.74361 | 1.18384 | −0.34263 | 1.74361 |
| 1.9169 | −1.06667 | 0.88252 | −1.38518 | 1.28804 | 0.88252 | −0.81428 | 0.61138 | 1.74361 | 1.09515 | −0.29427 | 1.74361 |

TABLE I-continued

| Suction Side or Surface | | | Pressure Side or Surface | | | Suction Side or Surface | | | Pressure Side or Surface | | |
|---|---|---|---|---|---|---|---|---|---|---|---|
| X | Y | Z | X | Y | Z | X | Y | Z | X | Y | Z |
| −0.7363 | 0.5358 | 1.74361 | 1.0035 | −0.24323 | 1.74361 | 1.25476 | −0.52452 | 2.17408 | −0.83923 | 1.04552 | 2.17408 |
| −0.65325 | 0.45952 | 1.74361 | 0.90903 | −0.18936 | 1.74361 | 1.34176 | −0.553 | 2.17408 | −0.90663 | 1.10304 | 2.17408 |
| −0.56513 | 0.38282 | 1.74361 | 0.81188 | −0.1324 | 1.74361 | 1.42523 | −0.57951 | 2.17408 | −0.96768 | 1.15578 | 2.17408 |
| −0.47136 | 0.30569 | 1.74361 | 0.71191 | −0.07233 | 1.74361 | 1.50123 | −0.6032 | 2.17408 | −1.02281 | 1.20372 | 2.17408 |
| −0.37562 | 0.2311 | 1.74361 | 0.61265 | −0.01114 | 1.74361 | 1.56989 | −0.62393 | 2.17408 | −1.07216 | 1.24672 | 2.17408 |
| −0.27848 | 0.15947 | 1.74361 | 0.51409 | 0.0509 | 1.74361 | 1.63095 | −0.64211 | 2.17408 | −1.11573 | 1.28451 | 2.17408 |
| −0.17963 | 0.09066 | 1.74361 | 0.41623 | 0.11407 | 1.74361 | 1.68819 | −0.65889 | 2.17408 | −1.15352 | 1.31708 | 2.17408 |
| −0.0791 | 0.02496 | 1.74361 | 0.3188 | 0.17794 | 1.74361 | 1.73797 | −0.67313 | 2.17408 | −1.18609 | 1.34415 | 2.17408 |
| 0.02341 | −0.03751 | 1.74361 | 0.22193 | 0.24252 | 1.74361 | 1.77632 | −0.68413 | 2.17408 | −1.21486 | 1.36601 | 2.17408 |
| 0.12746 | −0.09687 | 1.74361 | 0.12535 | 0.30766 | 1.74361 | 1.80692 | −0.69273 | 2.17408 | −1.2401 | 1.38307 | 2.17408 |
| 0.23321 | −0.15341 | 1.74361 | 0.02891 | 0.37295 | 1.74361 | 1.83018 | −0.69795 | 2.17408 | −1.26181 | 1.39534 | 2.17408 |
| 0.34037 | −0.20741 | 1.74361 | −0.06712 | 0.43893 | 1.74361 | 1.84724 | −0.69302 | 2.17408 | −1.28 | 1.40351 | 2.17408 |
| 0.4488 | −0.25916 | 1.74361 | −0.16243 | 0.50591 | 1.74361 | 1.85486 | −0.68667 | 2.17408 | −1.29466 | 1.40817 | 2.17408 |
| 0.5585 | −0.30865 | 1.74361 | −0.25704 | 0.57401 | 1.74361 | 1.85852 | −0.68145 | 2.17408 | −1.30608 | 1.40986 | 2.17408 |
| 0.66933 | −0.35617 | 1.74361 | −0.35081 | 0.64338 | 1.74361 | 1.85993 | −0.67863 | 2.17408 | −1.31567 | 1.40944 | 2.17408 |
| 0.77747 | −0.40044 | 1.74361 | −0.44063 | 0.71135 | 1.74361 | 1.8605 | −0.67708 | 2.17408 | −1.323 | 1.40718 | 2.17408 |
| 0.88266 | −0.44147 | 1.74361 | −0.52664 | 0.77804 | 1.74361 | −1.32441 | 1.38166 | 2.60455 | 1.8409 | −0.68526 | 2.60455 |
| 0.9846 | −0.47968 | 1.74361 | −0.60884 | 0.84318 | 1.74361 | −1.32836 | 1.37715 | 2.60455 | 1.84118 | −0.68456 | 2.60455 |
| 1.0833 | −0.51521 | 1.74361 | −0.68752 | 0.90649 | 1.74361 | −1.33175 | 1.36982 | 2.60455 | 1.8416 | −0.683 | 2.60455 |
| 1.17862 | −0.54821 | 1.74361 | −0.76267 | 0.96797 | 1.74361 | −1.33344 | 1.35995 | 2.60455 | 1.84217 | −0.68004 | 2.60455 |
| 1.27041 | −0.57895 | 1.74361 | −0.83458 | 1.02747 | 1.74361 | −1.33316 | 1.34796 | 2.60455 | 1.84259 | −0.67398 | 2.60455 |
| 1.35854 | −0.60757 | 1.74361 | −0.90296 | 1.085 | 1.74361 | −1.33048 | 1.33217 | 2.60455 | 1.84076 | −0.66482 | 2.60455 |
| 1.44328 | −0.63436 | 1.74361 | −0.96529 | 1.13773 | 1.74361 | −1.3247 | 1.31215 | 2.60455 | 1.8306 | −0.65142 | 2.60455 |
| 1.5204 | −0.65791 | 1.74361 | −1.02155 | 1.18553 | 1.74361 | −1.31511 | 1.28818 | 2.60455 | 1.81002 | −0.64141 | 2.60455 |
| 1.58992 | −0.67877 | 1.74361 | −1.07188 | 1.22839 | 1.74361 | −1.30129 | 1.25998 | 2.60455 | 1.7821 | −0.629 | 2.60455 |
| 1.65196 | −0.69682 | 1.74361 | −1.11644 | 1.26604 | 1.74361 | −1.28268 | 1.22741 | 2.60455 | 1.74727 | −0.61349 | 2.60455 |
| 1.71005 | −0.7136 | 1.74361 | −1.15507 | 1.29847 | 1.74361 | −1.25913 | 1.1906 | 2.60455 | 1.70187 | −0.59305 | 2.60455 |
| 1.76053 | −0.72784 | 1.74361 | −1.18835 | 1.32526 | 1.74361 | −1.22994 | 1.14802 | 2.60455 | 1.6497 | −0.56936 | 2.60455 |
| 1.79944 | −0.7387 | 1.74361 | −1.21768 | 1.34697 | 1.74361 | −1.19512 | 1.0998 | 2.60455 | 1.59415 | −0.54384 | 2.60455 |
| 1.83046 | −0.74716 | 1.74361 | −1.24348 | 1.36375 | 1.74361 | −1.15437 | 1.04594 | 2.60455 | 1.53182 | −0.51479 | 2.60455 |
| 1.85429 | −0.75097 | 1.74361 | −1.26562 | 1.37588 | 1.74361 | −1.10741 | 0.98686 | 2.60455 | 1.46273 | −0.48222 | 2.60455 |
| 1.87135 | −0.74462 | 1.74361 | −1.28423 | 1.38363 | 1.74361 | −1.05412 | 0.92285 | 2.60455 | 1.38702 | −0.44584 | 2.60455 |
| 1.87897 | −0.73757 | 1.74361 | −1.29917 | 1.38772 | 1.74361 | −0.99419 | 0.85446 | 2.60455 | 1.30806 | −0.40721 | 2.60455 |
| 1.88263 | −0.73207 | 1.74361 | −1.31088 | 1.38899 | 1.74361 | −0.93018 | 0.78467 | 2.60455 | 1.22614 | −0.36618 | 2.60455 |
| 1.88404 | −0.72911 | 1.74361 | −1.32047 | 1.38815 | 1.74361 | −0.86193 | 0.71374 | 2.60455 | 1.14111 | −0.32275 | 2.60455 |
| 1.88461 | −0.72756 | 1.74361 | −1.3278 | 1.38575 | 1.74361 | −0.78932 | 0.64183 | 2.60455 | 1.05313 | −0.27664 | 2.60455 |
| −1.32794 | 1.40408 | 2.17408 | 1.86078 | −0.67638 | 2.17408 | −0.71233 | 0.56894 | 2.60455 | 0.96218 | −0.22786 | 2.60455 |
| −1.33217 | 1.39971 | 2.17408 | 1.86106 | −0.67567 | 2.17408 | −0.63055 | 0.49533 | 2.60455 | 0.86856 | −0.17625 | 2.60455 |
| −1.33583 | 1.39238 | 2.17408 | 1.86148 | −0.67412 | 2.17408 | −0.54426 | 0.42117 | 2.60455 | 0.77226 | −0.12168 | 2.60455 |
| −1.33795 | 1.38251 | 2.17408 | 1.86219 | −0.67116 | 2.17408 | −0.45289 | 0.34658 | 2.60455 | 0.67342 | −0.06416 | 2.60455 |
| −1.33823 | 1.37038 | 2.17408 | 1.86275 | −0.6651 | 2.17408 | −0.35955 | 0.2741 | 2.60455 | 0.57528 | −0.0055 | 2.60455 |
| −1.33612 | 1.35431 | 2.17408 | 1.8612 | −0.65565 | 2.17408 | −0.26423 | 0.20375 | 2.60455 | 0.47771 | 0.05429 | 2.60455 |
| −1.3309 | 1.334 | 2.17408 | 1.85204 | −0.64127 | 2.17408 | −0.16709 | 0.13564 | 2.60455 | 0.38084 | 0.11506 | 2.60455 |
| −1.32188 | 1.30947 | 2.17408 | 1.83187 | −0.63041 | 2.17408 | −0.0681 | 0.07008 | 2.60455 | 0.28454 | 0.17681 | 2.60455 |
| −1.30848 | 1.2807 | 2.17408 | 1.80381 | −0.61758 | 2.17408 | 0.03243 | 0.00761 | 2.60455 | 0.18866 | 0.23928 | 2.60455 |
| −1.29057 | 1.24757 | 2.17408 | 1.76885 | −0.60165 | 2.17408 | 0.13423 | −0.05175 | 2.60455 | 0.0932 | 0.30245 | 2.60455 |
| −1.26759 | 1.2102 | 2.17408 | 1.7233 | −0.58092 | 2.17408 | 0.23744 | −0.10815 | 2.60455 | −0.00183 | 0.36618 | 2.60455 |
| −1.23911 | 1.16678 | 2.17408 | 1.67099 | −0.55667 | 2.17408 | 0.34178 | −0.16187 | 2.60455 | −0.09616 | 0.43104 | 2.60455 |
| −1.20485 | 1.11743 | 2.17408 | 1.61516 | −0.53044 | 2.17408 | 0.44725 | −0.21333 | 2.60455 | −0.18965 | 0.49717 | 2.60455 |
| −1.1648 | 1.06244 | 2.17408 | 1.55269 | −0.50083 | 2.17408 | 0.55357 | −0.2624 | 2.60455 | −0.28228 | 0.56471 | 2.60455 |
| −1.11855 | 1.00251 | 2.17408 | 1.48332 | −0.46742 | 2.17408 | 0.66101 | −0.30935 | 2.60455 | −0.37379 | 0.63351 | 2.60455 |
| −1.06568 | 0.93765 | 2.17408 | 1.40732 | −0.43019 | 2.17408 | 0.76549 | −0.35306 | 2.60455 | −0.46135 | 0.70119 | 2.60455 |
| −1.00632 | 0.86828 | 2.17408 | 1.32822 | −0.39071 | 2.17408 | 0.86715 | −0.39367 | 2.60455 | −0.54511 | 0.7676 | 2.60455 |
| −0.94244 | 0.79764 | 2.17408 | 1.24588 | −0.34883 | 2.17408 | 0.96585 | −0.43146 | 2.60455 | −0.62519 | 0.83246 | 2.60455 |
| −0.87406 | 0.72573 | 2.17408 | 1.16057 | −0.30456 | 2.17408 | 1.06131 | −0.46657 | 2.60455 | −0.70162 | 0.89591 | 2.60455 |
| −0.8013 | 0.65269 | 2.17408 | 1.07231 | −0.25761 | 2.17408 | 1.15366 | −0.49942 | 2.60455 | −0.77451 | 0.95753 | 2.60455 |
| −0.72361 | 0.57866 | 2.17408 | 0.98108 | −0.20783 | 2.17408 | 1.24263 | −0.53002 | 2.60455 | −0.84403 | 1.01732 | 2.60455 |
| −0.64113 | 0.50379 | 2.17408 | 0.88703 | −0.15524 | 2.17408 | 1.32822 | −0.5585 | 2.60455 | −0.9103 | 1.07498 | 2.60455 |
| −0.55357 | 0.42822 | 2.17408 | 0.79045 | −0.09983 | 2.17408 | 1.41056 | −0.58501 | 2.60455 | −0.97036 | 1.12814 | 2.60455 |
| −0.46107 | 0.3525 | 2.17408 | 0.69104 | −0.04131 | 2.17408 | 1.48544 | −0.6087 | 2.60455 | −1.02465 | 1.17636 | 2.60455 |
| −0.36688 | 0.27946 | 2.17408 | 0.59248 | 0.01833 | 2.17408 | 1.55312 | −0.62957 | 2.60455 | −1.07301 | 1.21979 | 2.60455 |
| −0.27128 | 0.20896 | 2.17408 | 0.49449 | 0.07896 | 2.17408 | 1.61346 | −0.64775 | 2.60455 | −1.11573 | 1.25786 | 2.60455 |
| −0.17414 | 0.141 | 2.17408 | 0.3972 | 0.14058 | 2.17408 | 1.67 | −0.66467 | 2.60455 | −1.15282 | 1.29086 | 2.60455 |
| −0.07515 | 0.07586 | 2.17408 | 0.30047 | 0.20318 | 2.17408 | 1.71907 | −0.67906 | 2.60455 | −1.18482 | 1.31807 | 2.60455 |
| 0.02552 | 0.01396 | 2.17408 | 0.20417 | 0.26635 | 2.17408 | 1.75686 | −0.68991 | 2.60455 | −1.21302 | 1.34021 | 2.60455 |
| 0.12803 | −0.04498 | 2.17408 | 0.10829 | 0.33022 | 2.17408 | 1.78703 | −0.69866 | 2.60455 | −1.23784 | 1.35755 | 2.60455 |
| 0.23209 | −0.10124 | 2.17408 | 0.01255 | 0.39466 | 2.17408 | 1.80988 | −0.70472 | 2.60455 | −1.25899 | 1.37038 | 2.60455 |
| 0.33755 | −0.15496 | 2.17408 | −0.08249 | 0.4598 | 2.17408 | 1.82694 | −0.70133 | 2.60455 | −1.2769 | 1.37912 | 2.60455 |
| 0.44443 | −0.20642 | 2.17408 | −0.17681 | 0.52621 | 2.17408 | 1.83469 | −0.69527 | 2.60455 | −1.29128 | 1.3842 | 2.60455 |
| 0.55258 | −0.25577 | 2.17408 | −0.27016 | 0.59389 | 2.17408 | 1.8385 | −0.6902 | 2.60455 | −1.30256 | 1.38645 | 2.60455 |
| 0.662 | −0.30301 | 2.17408 | −0.36265 | 0.66284 | 2.17408 | 1.83991 | −0.68738 | 2.60455 | −1.31201 | 1.38645 | 2.60455 |
| 0.76873 | −0.347 | 2.17408 | −0.4512 | 0.73052 | 2.17408 | 1.84061 | −0.68597 | 2.60455 | −1.31948 | 1.38462 | 2.60455 |
| 0.87237 | −0.38775 | 2.17408 | −0.53608 | 0.79679 | 2.17408 | −1.31412 | 1.30467 | 3.03503 | 1.80198 | −0.73334 | 3.03503 |
| 0.9729 | −0.42568 | 2.17408 | −0.61716 | 0.86165 | 2.17408 | −1.31793 | 1.3003 | 3.03503 | 1.80226 | −0.73264 | 3.03503 |
| 1.07019 | −0.46107 | 2.17408 | −0.69471 | 0.92482 | 2.17408 | −1.32103 | 1.29297 | 3.03503 | 1.80269 | −0.73123 | 3.03503 |
| 1.16424 | −0.49392 | 2.17408 | −0.76873 | 0.98615 | 2.17408 | −1.32216 | 1.28324 | 3.03503 | 1.80325 | −0.72827 | 3.03503 |

TABLE I-continued

| Suction Side or Surface | | | Pressure Side or Surface | | | Suction Side or Surface | | | Pressure Side or Surface | | |
|---|---|---|---|---|---|---|---|---|---|---|---|
| X | Y | Z | X | Y | Z | X | Y | Z | X | Y | Z |
| −1.32145 | 1.27154 | 3.03503 | 1.80367 | −0.72234 | 3.03503 | −0.36265 | 0.12775 | 3.45887 | 0.52819 | −0.1692 | 3.45887 |
| −1.31849 | 1.25617 | 3.03503 | 1.80156 | −0.71332 | 3.03503 | −0.27213 | 0.06007 | 3.45887 | 0.43358 | −0.11181 | 3.45887 |
| −1.31243 | 1.23671 | 3.03503 | 1.79112 | −0.70063 | 3.03503 | −0.1802 | −0.0055 | 3.45887 | 0.33939 | −0.05358 | 3.45887 |
| −1.3027 | 1.21331 | 3.03503 | 1.77068 | −0.69132 | 3.03503 | −0.08657 | −0.06895 | 3.45887 | 0.2459 | 0.00578 | 3.45887 |
| −1.28888 | 1.18595 | 3.03503 | 1.74304 | −0.6792 | 3.03503 | 0.00874 | −0.12986 | 3.45887 | 0.1527 | 0.06585 | 3.45887 |
| −1.27041 | 1.15423 | 3.03503 | 1.7085 | −0.66411 | 3.03503 | 0.10603 | −0.18809 | 3.45887 | 0.06007 | 0.12662 | 3.45887 |
| −1.24715 | 1.11841 | 3.03503 | 1.6638 | −0.64437 | 3.03503 | 0.20516 | −0.24379 | 3.45887 | −0.03187 | 0.18824 | 3.45887 |
| −1.2181 | 1.0771 | 3.03503 | 1.61219 | −0.62125 | 3.03503 | 0.30597 | −0.29709 | 3.45887 | −0.12281 | 0.25126 | 3.45887 |
| −1.1837 | 1.03029 | 3.03503 | 1.55735 | −0.59657 | 3.03503 | 0.40834 | −0.34799 | 3.45887 | −0.21277 | 0.31556 | 3.45887 |
| −1.14337 | 0.97798 | 3.03503 | 1.49559 | −0.56837 | 3.03503 | 0.51155 | −0.39663 | 3.45887 | −0.30174 | 0.38141 | 3.45887 |
| −1.09712 | 0.92045 | 3.03503 | 1.42734 | −0.53679 | 3.03503 | 0.61575 | −0.44316 | 3.45887 | −0.39972 | 0.44852 | 3.45887 |
| −1.04467 | 0.85813 | 3.03503 | 1.35247 | −0.5014 | 3.03503 | 0.71741 | −0.48631 | 3.45887 | −0.4739 | 0.51479 | 3.45887 |
| −0.98559 | 0.79129 | 3.03503 | 1.2745 | −0.46389 | 3.03503 | 0.81605 | −0.52635 | 3.45887 | −0.55427 | 0.57979 | 3.45887 |
| −0.9227 | 0.72305 | 3.03503 | 1.19342 | −0.42399 | 3.03503 | 0.91199 | −0.56344 | 3.45887 | −0.63112 | 0.64352 | 3.45887 |
| −0.85587 | 0.65368 | 3.03503 | 1.10939 | −0.38169 | 3.03503 | 1.00477 | −0.59798 | 3.45887 | −0.7043 | 0.70585 | 3.45887 |
| −0.78481 | 0.58332 | 3.03503 | 1.02239 | −0.33671 | 3.03503 | 1.09444 | −0.63013 | 3.45887 | −0.77395 | 0.76648 | 3.45887 |
| −0.70951 | 0.51211 | 3.03503 | 0.93272 | −0.28905 | 3.03503 | 1.18073 | −0.65988 | 3.45887 | −0.84022 | 0.82541 | 3.45887 |
| −0.62985 | 0.44006 | 3.03503 | 0.84022 | −0.23871 | 3.03503 | 1.26378 | −0.6878 | 3.45887 | −0.90325 | 0.88238 | 3.45887 |
| −0.54553 | 0.36745 | 3.03503 | 0.74504 | −0.18542 | 3.03503 | 1.34359 | −0.7136 | 3.45887 | −0.96049 | 0.93483 | 3.45887 |
| −0.4567 | 0.29455 | 3.03503 | 0.64747 | −0.12916 | 3.03503 | 1.4162 | −0.73658 | 3.45887 | −1.01196 | 0.98263 | 3.45887 |
| −0.36604 | 0.22363 | 3.03503 | 0.55046 | −0.07163 | 3.03503 | 1.48163 | −0.75689 | 3.45887 | −1.05792 | 1.02549 | 3.45887 |
| −0.27354 | 0.15482 | 3.03503 | 0.45402 | −0.01311 | 3.03503 | 1.53986 | −0.77465 | 3.45887 | −1.09839 | 1.06328 | 3.45887 |
| −0.17949 | 0.08813 | 3.03503 | 0.35842 | 0.04653 | 3.03503 | 1.59457 | −0.79101 | 3.45887 | −1.13378 | 1.09585 | 3.45887 |
| −0.08347 | 0.02355 | 3.03503 | 0.26325 | 0.10716 | 3.03503 | 1.64209 | −0.80497 | 3.45887 | −1.16424 | 1.12264 | 3.45887 |
| 0.01466 | −0.03849 | 3.03503 | 0.16864 | 0.1685 | 3.03503 | 1.67861 | −0.81569 | 3.45887 | −1.19117 | 1.1445 | 3.45887 |
| 0.11477 | −0.09785 | 3.03503 | 0.07431 | 0.23054 | 3.03503 | 1.70793 | −0.82415 | 3.45887 | −1.21472 | 1.16184 | 3.45887 |
| 0.21644 | −0.15454 | 3.03503 | −0.01932 | 0.29342 | 3.03503 | 1.72993 | −0.83035 | 3.45887 | −1.23488 | 1.17495 | 3.45887 |
| 0.31937 | −0.20854 | 3.03503 | −0.11224 | 0.35744 | 3.03503 | 1.74657 | −0.82809 | 3.45887 | −1.2518 | 1.18398 | 3.45887 |
| 0.42356 | −0.26 | 3.03503 | −0.20417 | 0.42286 | 3.03503 | 1.75432 | −0.82259 | 3.45887 | −1.26548 | 1.18962 | 3.45887 |
| 0.52889 | −0.3095 | 3.03503 | −0.29497 | 0.48969 | 3.03503 | 1.75799 | −0.8178 | 3.45887 | −1.27619 | 1.19258 | 3.45887 |
| 0.63535 | −0.35673 | 3.03503 | −0.38479 | 0.55766 | 3.03503 | 1.7594 | −0.81512 | 3.45887 | −1.28536 | 1.19328 | 3.45887 |
| 0.73898 | −0.40058 | 3.03503 | −0.4708 | 0.62477 | 3.03503 | 1.75996 | −0.81371 | 3.45887 | −1.29255 | 1.19187 | 3.45887 |
| 0.83966 | −0.44133 | 3.03503 | −0.553 | 0.69062 | 3.03503 | −1.28028 | 1.05101 | 3.88934 | 1.7281 | −0.92186 | 3.88934 |
| 0.93737 | −0.47912 | 3.03503 | −0.6314 | 0.75506 | 3.03503 | −1.28395 | 1.04664 | 3.88934 | 1.72838 | −0.92115 | 3.88934 |
| 1.03198 | −0.51437 | 3.03503 | −0.70627 | 0.81808 | 3.03503 | −1.28648 | 1.03945 | 3.88934 | 1.7288 | −0.91974 | 3.88934 |
| 1.12321 | −0.54708 | 3.03503 | −0.77762 | 0.87942 | 3.03503 | −1.28719 | 1.03001 | 3.88934 | 1.72937 | −0.91692 | 3.88934 |
| 1.21133 | −0.57754 | 3.03503 | −0.84544 | 0.93892 | 3.03503 | −1.28606 | 1.01858 | 3.88934 | 1.72965 | −0.911 | 3.88934 |
| 1.29593 | −0.60588 | 3.03503 | −0.91016 | 0.99645 | 3.03503 | −1.28254 | 1.00392 | 3.88934 | 1.72725 | −0.90226 | 3.88934 |
| 1.37715 | −0.63239 | 3.03503 | −0.96881 | 1.04946 | 3.03503 | −1.27633 | 0.98545 | 3.88934 | 1.71611 | −0.89042 | 3.88934 |
| 1.45117 | −0.65593 | 3.03503 | −1.02155 | 1.09754 | 3.03503 | −1.2666 | 0.96303 | 3.88934 | 1.69609 | −0.88181 | 3.88934 |
| 1.51787 | −0.67652 | 3.03503 | −1.06878 | 1.14083 | 3.03503 | −1.25307 | 0.93666 | 3.88934 | 1.6693 | −0.87053 | 3.88934 |
| 1.57723 | −0.69471 | 3.03503 | −1.11038 | 1.17904 | 3.03503 | −1.2353 | 0.90649 | 3.88934 | 1.63574 | −0.85629 | 3.88934 |
| 1.63306 | −0.71135 | 3.03503 | −1.14647 | 1.2119 | 3.03503 | −1.21274 | 0.87194 | 3.88934 | 1.59231 | −0.83754 | 3.88934 |
| 1.68143 | −0.72573 | 3.03503 | −1.17777 | 1.23897 | 3.03503 | −1.18468 | 0.83232 | 3.88934 | 1.5424 | −0.81583 | 3.88934 |
| 1.71865 | −0.73658 | 3.03503 | −1.20527 | 1.26125 | 3.03503 | −1.15098 | 0.78734 | 3.88934 | 1.4891 | −0.79242 | 3.88934 |
| 1.74854 | −0.74519 | 3.03503 | −1.22938 | 1.27859 | 3.03503 | −1.11193 | 0.73715 | 3.88934 | 1.42932 | −0.76577 | 3.88934 |
| 1.77096 | −0.75153 | 3.03503 | −1.25011 | 1.2917 | 3.03503 | −1.06723 | 0.68202 | 3.88934 | 1.36305 | −0.73574 | 3.88934 |
| 1.78802 | −0.74899 | 3.03503 | −1.26745 | 1.30058 | 3.03503 | −1.01675 | 0.62209 | 3.88934 | 1.29043 | −0.70232 | 3.88934 |
| 1.79578 | −0.74321 | 3.03503 | −1.28155 | 1.30608 | 3.03503 | −0.95993 | 0.5578 | 3.88934 | 1.21472 | −0.66679 | 3.88934 |
| 1.79958 | −0.73828 | 3.03503 | −1.29241 | 1.30862 | 3.03503 | −0.8993 | 0.49181 | 3.88934 | 1.13618 | −0.62886 | 3.88934 |
| 1.80113 | −0.7356 | 3.03503 | −1.30185 | 1.30919 | 3.03503 | −0.83458 | 0.42427 | 3.88934 | 1.05468 | −0.58868 | 3.88934 |
| 1.8017 | −0.73419 | 3.03503 | −1.30919 | 1.30749 | 3.03503 | −0.76563 | 0.35574 | 3.88934 | 0.97036 | −0.54595 | 3.88934 |
| −1.29734 | 1.18905 | 3.45887 | 1.76024 | −0.81301 | 3.45887 | −0.69259 | 0.28609 | 3.88934 | 0.88337 | −0.50055 | 3.88934 |
| −1.30115 | 1.18468 | 3.45887 | 1.76053 | −0.8123 | 3.45887 | −0.61547 | 0.21573 | 3.88934 | 0.79383 | −0.45247 | 3.88934 |
| −1.30383 | 1.17749 | 3.45887 | 1.76095 | −0.81089 | 3.45887 | −0.53411 | 0.14509 | 3.88934 | 0.70162 | −0.40157 | 3.88934 |
| −1.30481 | 1.1679 | 3.45887 | 1.76151 | −0.80793 | 3.45887 | −0.44824 | 0.07403 | 3.88934 | 0.60686 | −0.34771 | 3.88934 |
| −1.30383 | 1.15634 | 3.45887 | 1.7618 | −0.80201 | 3.45887 | −0.36082 | 0.00508 | 3.88934 | 0.51282 | −0.29258 | 3.88934 |
| −1.30058 | 1.1414 | 3.45887 | 1.75954 | −0.79298 | 3.45887 | −0.27185 | −0.06176 | 3.88934 | 0.41948 | −0.23632 | 3.88934 |
| −1.29438 | 1.1225 | 3.45887 | 1.74854 | −0.78072 | 3.45887 | −0.18147 | −0.12648 | 3.88934 | 0.3267 | −0.17907 | 3.88934 |
| −1.28451 | 1.09952 | 3.45887 | 1.72824 | −0.77183 | 3.45887 | −0.08939 | −0.18922 | 3.88934 | 0.23448 | −0.12084 | 3.88934 |
| −1.27083 | 1.07287 | 3.45887 | 1.70102 | −0.76013 | 3.45887 | 0.00423 | −0.24957 | 3.88934 | 0.14269 | −0.0619 | 3.88934 |
| −1.25279 | 1.04213 | 3.45887 | 1.66718 | −0.74547 | 3.45887 | 0.09983 | −0.30738 | 3.88934 | 0.05147 | −0.0024 | 3.88934 |
| −1.22994 | 1.00716 | 3.45887 | 1.62319 | −0.72629 | 3.45887 | 0.1974 | −0.36265 | 3.88934 | −0.03906 | 0.05823 | 3.88934 |
| −1.20132 | 0.9667 | 3.45887 | 1.57243 | −0.70401 | 3.45887 | 0.29666 | −0.41539 | 3.88934 | −0.12859 | 0.12041 | 3.88934 |
| −1.1672 | 0.92101 | 3.45887 | 1.51843 | −0.68004 | 3.45887 | 0.3972 | −0.46558 | 3.88934 | −0.21714 | 0.18386 | 3.88934 |
| −1.12758 | 0.86997 | 3.45887 | 1.4578 | −0.65269 | 3.45887 | 0.49872 | −0.51352 | 3.88934 | −0.3047 | 0.24887 | 3.88934 |
| −1.08218 | 0.81399 | 3.45887 | 1.39054 | −0.62195 | 3.45887 | 0.60137 | −0.55921 | 3.88934 | −0.39128 | 0.31528 | 3.88934 |
| −1.03071 | 0.75308 | 3.45887 | 1.31694 | −0.58769 | 3.45887 | 0.70133 | −0.60165 | 3.88934 | −0.47404 | 0.38084 | 3.88934 |
| −0.9729 | 0.6878 | 3.45887 | 1.2401 | −0.55131 | 3.45887 | 0.79862 | −0.64099 | 3.88934 | −0.55286 | 0.44528 | 3.88934 |
| −0.91114 | 0.62096 | 3.45887 | 1.16043 | −0.51254 | 3.45887 | 0.89295 | −0.67736 | 3.88934 | −0.62816 | 0.50845 | 3.88934 |
| −0.8453 | 0.55258 | 3.45887 | 1.0778 | −0.47163 | 3.45887 | 0.98432 | −0.7112 | 3.88934 | −0.69978 | 0.5702 | 3.88934 |
| −0.77508 | 0.48293 | 3.45887 | 0.99222 | −0.42765 | 3.45887 | 1.07259 | −0.74265 | 3.88934 | −0.76789 | 0.63041 | 3.88934 |
| −0.70063 | 0.41243 | 3.45887 | 0.90409 | −0.38126 | 3.45887 | 1.15761 | −0.77198 | 3.88934 | −0.83289 | 0.68879 | 3.88934 |
| −0.62195 | 0.34122 | 3.45887 | 0.81315 | −0.3322 | 3.45887 | 1.23939 | −0.79919 | 3.88934 | −0.8945 | 0.74533 | 3.88934 |
| −0.5389 | 0.26959 | 3.45887 | 0.71966 | −0.28017 | 3.45887 | 1.31793 | −0.82457 | 3.88934 | −0.95048 | 0.7975 | 3.88934 |
| −0.45162 | 0.19754 | 3.45887 | 0.62364 | −0.22532 | 3.45887 | 1.38941 | −0.84699 | 3.88934 | −1.00082 | 0.84487 | 3.88934 |

TABLE I-continued

| Suction Side or Surface | | | Pressure Side or Surface | | | Suction Side or Surface | | | Pressure Side or Surface | | |
|---|---|---|---|---|---|---|---|---|---|---|---|
| X | Y | Z | X | Y | Z | X | Y | Z | X | Y | Z |
| 1.45385 | −0.86687 | 3.88934 | −1.04566 | 0.88745 | 3.88934 | −1.22501 | 0.68653 | 4.75043 | 1.62644 | −1.15634 | 4.75043 |
| 1.51124 | −0.88421 | 3.88934 | −1.08514 | 0.9251 | 3.88934 | −1.20795 | 0.65636 | 4.75043 | 1.59344 | −1.14224 | 4.75043 |
| 1.5651 | −0.90029 | 3.88934 | −1.11982 | 0.95725 | 3.88934 | −1.18637 | 0.62195 | 4.75043 | 1.55044 | −1.12363 | 4.75043 |
| 1.61191 | −0.91396 | 3.88934 | −1.14986 | 0.9839 | 3.88934 | −1.15916 | 0.58205 | 4.75043 | 1.50109 | −1.10206 | 4.75043 |
| 1.64787 | −0.92426 | 3.88934 | −1.17622 | 1.00561 | 3.88934 | −1.12659 | 0.53721 | 4.75043 | 1.44849 | −1.07879 | 4.75043 |
| 1.67677 | −0.93257 | 3.88934 | −1.19921 | 1.02281 | 3.88934 | −1.0888 | 0.48687 | 4.75043 | 1.38941 | −1.05214 | 4.75043 |
| 1.69835 | −0.93864 | 3.88934 | −1.21895 | 1.03579 | 3.88934 | −1.04566 | 0.4316 | 4.75043 | 1.32413 | −1.02211 | 4.75043 |
| 1.7147 | −0.93666 | 3.88934 | −1.23544 | 1.04509 | 3.88934 | −0.99687 | 0.37139 | 4.75043 | 1.2525 | −0.98841 | 4.75043 |
| 1.72217 | −0.93131 | 3.88934 | −1.24884 | 1.05073 | 3.88934 | −0.94188 | 0.30653 | 4.75043 | 1.17791 | −0.9526 | 4.75043 |
| 1.72584 | −0.92665 | 3.88934 | −1.25927 | 1.05383 | 3.88934 | −0.88337 | 0.23998 | 4.75043 | 1.10051 | −0.91424 | 4.75043 |
| 1.72725 | −0.92397 | 3.88934 | −1.2683 | 1.05482 | 3.88934 | −0.82104 | 0.1716 | 4.75043 | 1.02042 | −0.87364 | 4.75043 |
| 1.72781 | −0.92256 | 3.88934 | −1.27549 | 1.05355 | 3.88934 | −0.75463 | 0.10208 | 4.75043 | 0.93765 | −0.83035 | 4.75043 |
| −1.26999 | 0.90635 | 4.31982 | 1.69679 | −1.05228 | 4.31982 | −0.68415 | 0.03158 | 4.75043 | 0.8522 | −0.78424 | 4.75043 |
| −1.27351 | 0.90198 | 4.31982 | 1.69708 | −1.05172 | 4.31982 | −0.60968 | −0.04004 | 4.75043 | 0.76436 | −0.73546 | 4.75043 |
| −1.27591 | 0.89479 | 4.31982 | 1.6975 | −1.05031 | 4.31982 | −0.53115 | −0.1121 | 4.75043 | 0.67398 | −0.68357 | 4.75043 |
| −1.27647 | 0.88548 | 4.31982 | 1.69806 | −1.04749 | 4.31982 | −0.44824 | −0.18485 | 4.75043 | 0.58134 | −0.62872 | 4.75043 |
| −1.2752 | 0.87434 | 4.31982 | 1.6982 | −1.04171 | 4.31982 | −0.36378 | −0.25549 | 4.75043 | 0.48927 | −0.5726 | 4.75043 |
| −1.27168 | 0.85982 | 4.31982 | 1.69581 | −1.03297 | 4.31982 | −0.27763 | −0.32402 | 4.75043 | 0.3979 | −0.51536 | 4.75043 |
| −1.26548 | 0.84149 | 4.31982 | 1.68453 | −1.02155 | 4.31982 | −0.18979 | −0.39057 | 4.75043 | 0.3071 | −0.45698 | 4.75043 |
| −1.25575 | 0.81935 | 4.31982 | 1.66465 | −1.01323 | 4.31982 | −0.10053 | −0.45515 | 4.75043 | 0.21686 | −0.3979 | 4.75043 |
| −1.24249 | 0.79341 | 4.31982 | 1.63814 | −1.00209 | 4.31982 | −0.00945 | −0.51761 | 4.75043 | 0.12704 | −0.33812 | 4.75043 |
| −1.22501 | 0.76352 | 4.31982 | 1.60514 | −0.98799 | 4.31982 | 0.08347 | −0.57768 | 4.75043 | 0.03807 | −0.27749 | 4.75043 |
| −1.20287 | 0.72925 | 4.31982 | 1.56214 | −0.96966 | 4.31982 | 0.17851 | −0.63506 | 4.75043 | −0.05006 | −0.21531 | 4.75043 |
| −1.17524 | 0.68991 | 4.31982 | 1.51265 | −0.94823 | 4.31982 | 0.27537 | −0.68963 | 4.75043 | −0.13705 | −0.15172 | 4.75043 |
| −1.14224 | 0.64506 | 4.31982 | 1.46006 | −0.9251 | 4.31982 | 0.37351 | −0.74166 | 4.75043 | −0.22292 | −0.08657 | 4.75043 |
| −1.10375 | 0.59573 | 4.31982 | 1.40098 | −0.89888 | 4.31982 | 0.47291 | −0.79115 | 4.75043 | −0.30766 | −0.01988 | 4.75043 |
| −1.05976 | 0.54116 | 4.31982 | 1.33541 | −0.86927 | 4.31982 | 0.57345 | −0.83839 | 4.75043 | −0.39156 | 0.04808 | 4.75043 |
| −1.00998 | 0.48166 | 4.31982 | 1.26364 | −0.83613 | 4.31982 | 0.67172 | −0.8821 | 4.75043 | −0.4715 | 0.1152 | 4.75043 |
| −0.95401 | 0.41792 | 4.31982 | 1.18891 | −0.80102 | 4.31982 | 0.76732 | −0.92228 | 4.75043 | −0.54764 | 0.18119 | 4.75043 |
| −0.89436 | 0.3525 | 4.31982 | 1.11122 | −0.76352 | 4.31982 | 0.86024 | −0.95965 | 4.75043 | −0.62026 | 0.24562 | 4.75043 |
| −0.83077 | 0.28553 | 4.31982 | 1.03071 | −0.72361 | 4.31982 | 0.9502 | −0.99419 | 4.75043 | −0.68949 | 0.30865 | 4.75043 |
| −0.76295 | 0.21756 | 4.31982 | 0.94752 | −0.68131 | 4.31982 | 1.0372 | −1.0262 | 4.75043 | −0.75534 | 0.36998 | 4.75043 |
| −0.6909 | 0.14833 | 4.31982 | 0.86165 | −0.63647 | 4.31982 | 1.12095 | −1.05581 | 4.75043 | −0.81794 | 0.42949 | 4.75043 |
| −0.61504 | 0.07854 | 4.31982 | 0.77324 | −0.58882 | 4.31982 | 1.20174 | −1.0833 | 4.75043 | −0.87744 | 0.48716 | 4.75043 |
| −0.53481 | 0.00818 | 4.31982 | 0.68216 | −0.5382 | 4.31982 | 1.27915 | −1.10882 | 4.75043 | −0.93131 | 0.54017 | 4.75043 |
| −0.45035 | −0.06246 | 4.31982 | 0.58868 | −0.48476 | 4.31982 | 1.34979 | −1.13138 | 4.75043 | −0.97981 | 0.58825 | 4.75043 |
| −0.36434 | −0.13099 | 4.31982 | 0.4959 | −0.43005 | 4.31982 | 1.41353 | −1.15112 | 4.75043 | −1.0231 | 0.63154 | 4.75043 |
| −0.27678 | −0.1974 | 4.31982 | 0.40368 | −0.37436 | 4.31982 | 1.47035 | −1.16833 | 4.75043 | −1.06131 | 0.66975 | 4.75043 |
| −0.18781 | −0.26184 | 4.31982 | 0.31203 | −0.31753 | 4.31982 | 1.52365 | −1.18426 | 4.75043 | −1.09487 | 0.70232 | 4.75043 |
| −0.09729 | −0.32416 | 4.31982 | 0.22095 | −0.25986 | 4.31982 | 1.56989 | −1.19765 | 4.75043 | −1.12391 | 0.72925 | 4.75043 |
| −0.00508 | −0.38437 | 4.31982 | 0.13043 | −0.20163 | 4.31982 | 1.60557 | −1.20795 | 4.75043 | −1.14957 | 0.75139 | 4.75043 |
| 0.08897 | −0.44204 | 4.31982 | 0.04033 | −0.14255 | 4.31982 | 1.63405 | −1.21598 | 4.75043 | −1.17185 | 0.76901 | 4.75043 |
| 0.18485 | −0.49703 | 4.31982 | −0.04907 | −0.08234 | 4.31982 | 1.65548 | −1.22205 | 4.75043 | −1.19103 | 0.78241 | 4.75043 |
| 0.28256 | −0.54962 | 4.31982 | −0.13733 | −0.02073 | 4.31982 | 1.67184 | −1.22078 | 4.75043 | −1.2071 | 0.792 | 4.75043 |
| 0.38169 | −0.59967 | 4.31982 | −0.22461 | 0.04244 | 4.31982 | 1.67959 | −1.21556 | 4.75043 | −1.22007 | 0.79834 | 4.75043 |
| 0.48194 | −0.64747 | 4.31982 | −0.31201 | 0.10716 | 4.31982 | 1.68326 | −1.21105 | 4.75043 | −1.23023 | 0.80173 | 4.75043 |
| 0.58318 | −0.69316 | 4.31982 | −0.39607 | 0.17329 | 4.31982 | 1.68467 | −1.20837 | 4.75043 | −1.23911 | 0.80314 | 4.75043 |
| 0.68202 | −0.73532 | 4.31982 | −0.47743 | 0.23843 | 4.31982 | 1.68523 | −1.20696 | 4.75043 | −1.2463 | 0.80229 | 4.75043 |
| 0.77804 | −0.77437 | 4.31982 | −0.55512 | 0.30259 | 4.31982 | −1.21641 | 0.80018 | 5.1809 | 1.65506 | −1.38166 | 5.1809 |
| 0.87124 | −0.81047 | 4.31982 | −0.62914 | 0.36513 | 4.31982 | −1.22036 | 0.79595 | 5.1809 | 1.6552 | −1.38095 | 5.1809 |
| 0.96162 | −0.84403 | 4.31982 | −0.69964 | 0.42681 | 4.31982 | −1.22318 | 0.7889 | 5.1809 | 1.65562 | −1.37954 | 5.1809 |
| 1.04876 | −0.87533 | 4.31982 | −0.76662 | 0.48673 | 4.31982 | −1.2243 | 0.77945 | 5.1809 | 1.65633 | −1.37672 | 5.1809 |
| 1.13279 | −0.90423 | 4.31982 | −0.83035 | 0.54497 | 4.31982 | −1.2236 | 0.76803 | 5.1809 | 1.65633 | −1.3708 | 5.1809 |
| 1.21359 | −0.93116 | 4.31982 | −0.89098 | 0.60122 | 4.31982 | −1.22016 | 0.75308 | 5.1809 | 1.65365 | −1.36206 | 5.1809 |
| 1.29114 | −0.95626 | 4.31982 | −0.94583 | 0.65325 | 4.31982 | −1.2157 | 0.73391 | 5.1809 | 1.64166 | −1.35106 | 5.1809 |
| 1.36192 | −0.97854 | 4.31982 | −0.99504 | 0.70049 | 4.31982 | −1.20752 | 0.71078 | 5.1809 | 1.62136 | −1.3426 | 5.1809 |
| 1.42565 | −0.99814 | 4.31982 | −1.03903 | 0.74293 | 4.31982 | −1.19582 | 0.68343 | 5.1809 | 1.59443 | −1.33118 | 5.1809 |
| 1.48233 | −1.0152 | 4.31982 | −1.07795 | 0.78029 | 4.31982 | −1.18031 | 0.6517 | 5.1809 | 1.56087 | −1.31666 | 5.1809 |
| 1.53563 | −1.03085 | 4.31982 | −1.11207 | 0.8123 | 4.31982 | −1.16043 | 0.61518 | 5.1809 | 1.5173 | −1.29762 | 5.1809 |
| 1.58188 | −1.04439 | 4.31982 | −1.14154 | 0.83867 | 4.31982 | −1.13533 | 0.57302 | 5.1809 | 1.46725 | −1.27535 | 5.1809 |
| 1.61755 | −1.05454 | 4.31982 | −1.16748 | 0.86038 | 4.31982 | −1.10516 | 0.52508 | 5.1809 | 1.41395 | −1.25109 | 5.1809 |
| 1.64603 | −1.06272 | 4.31982 | −1.19018 | 0.87744 | 4.31982 | −1.06991 | 0.47165 | 5.1809 | 1.35431 | −1.22332 | 5.1809 |
| 1.66747 | −1.06864 | 4.31982 | −1.2095 | 0.89042 | 4.31982 | −1.02972 | 0.41243 | 5.1809 | 1.28846 | −1.19173 | 5.1809 |
| 1.68354 | −1.06681 | 4.31982 | −1.22585 | 0.89972 | 4.31982 | −0.98404 | 0.34785 | 5.1809 | 1.21627 | −1.1562 | 5.1809 |
| 1.69087 | −1.06159 | 4.31982 | −1.23897 | 0.90564 | 4.31982 | −0.93272 | 0.27819 | 5.1809 | 1.1414 | −1.11799 | 5.1809 |
| 1.69454 | −1.05694 | 4.31982 | −1.24926 | 0.90875 | 4.31982 | −0.87773 | 0.20628 | 5.1809 | 1.06385 | −1.0771 | 5.1809 |
| 1.69595 | −1.0544 | 4.31982 | −1.25814 | 0.90987 | 4.31982 | −0.81921 | 0.13254 | 5.1809 | 0.98362 | −1.03339 | 5.1809 |
| 1.69651 | −1.05299 | 4.31982 | −1.26519 | 0.90889 | 4.31982 | −0.75647 | 0.05725 | 5.1809 | 0.90099 | −0.98658 | 5.1809 |
| −1.25109 | 0.79989 | 4.75043 | 1.68551 | −1.20626 | 4.75043 | −0.68991 | −0.01932 | 5.1809 | 0.81597 | −0.9368 | 5.1809 |
| −1.25476 | 0.79552 | 4.75043 | 1.6858 | −1.20569 | 4.75043 | −0.61955 | −0.09715 | 5.1809 | 0.72869 | −0.88379 | 5.1809 |
| −1.2573 | 0.78847 | 4.75043 | 1.68622 | −1.20428 | 4.75043 | −0.54497 | −0.17569 | 5.1809 | 0.63915 | −0.82753 | 5.1809 |
| −1.25786 | 0.77917 | 4.75043 | 1.68678 | −1.20146 | 4.75043 | −0.46601 | −0.25521 | 5.1809 | 0.54736 | −0.7676 | 5.1809 |
| −1.25673 | 0.76789 | 4.75043 | 1.68692 | −1.19554 | 4.75043 | −0.38549 | −0.33248 | 5.1809 | 0.45656 | −0.70641 | 5.1809 |
| −1.25349 | 0.7535 | 4.75043 | 1.68439 | −1.18694 | 4.75043 | −0.30301 | −0.40777 | 5.1809 | 0.36646 | −0.64381 | 5.1809 |
| −1.24729 | 0.73503 | 4.75043 | 1.67282 | −1.17594 | 4.75043 | −0.21869 | −0.48109 | 5.1809 | 0.27721 | −0.58022 | 5.1809 |
| −1.23798 | 0.71276 | 4.75043 | 1.65294 | −1.16748 | 4.75043 | −0.13268 | −0.55216 | 5.1809 | 0.18852 | −0.51578 | 5.1809 |

TABLE I-continued

| Suction Side or Surface | | | Pressure Side or Surface | | | Suction Side or Surface | | | Pressure Side or Surface | | |
|---|---|---|---|---|---|---|---|---|---|---|---|
| X | Y | Z | X | Y | Z | X | Y | Z | X | Y | Z |
| −0.04484 | −0.62125 | 5.1809 | 0.10067 | −0.45035 | 5.1809 | 1.5369 | −1.49474 | 5.42075 | −1.09543 | 0.77606 | 5.42075 |
| 0.04512 | −0.68794 | 5.1809 | 0.01396 | −0.38352 | 5.1809 | 1.56665 | −1.50306 | 5.42075 | −1.11573 | 0.79736 | 5.42075 |
| 0.13733 | −0.75209 | 5.1809 | −0.07135 | −0.31499 | 5.1809 | 1.58893 | −1.50926 | 5.42075 | −1.13322 | 0.81385 | 5.42075 |
| 0.23195 | −0.81329 | 5.1809 | −0.15552 | −0.24492 | 5.1809 | 1.60585 | −1.5087 | 5.42075 | −1.14802 | 0.82626 | 5.42075 |
| 0.32909 | −0.8718 | 5.1809 | −0.23829 | −0.17301 | 5.1809 | 1.61389 | −1.50362 | 5.42075 | −1.16029 | 0.83472 | 5.42075 |
| 0.42808 | −0.9275 | 5.1809 | −0.31979 | −0.09955 | 5.1809 | 1.61783 | −1.49883 | 5.42075 | −1.17002 | 0.83994 | 5.42075 |
| 0.52847 | −0.98051 | 5.1809 | −0.40002 | −0.02468 | 5.1809 | 1.61924 | −1.49615 | 5.42075 | −1.1789 | 0.84304 | 5.42075 |
| 0.62675 | −1.02944 | 5.1809 | −0.4763 | 0.04893 | 5.1809 | 1.61995 | −1.49474 | 5.42075 | −1.18623 | 0.84346 | 5.42075 |
| 0.72277 | −1.07428 | 5.1809 | −0.54877 | 0.12112 | 5.1809 | −1.16804 | 0.88153 | 5.61843 | 1.57314 | −1.6019 | 5.61843 |
| 0.81625 | −1.11573 | 5.1809 | −0.61786 | 0.19162 | 5.1809 | −1.17242 | 0.87758 | 5.61843 | 1.57342 | −1.6012 | 5.61843 |
| 0.90705 | −1.15394 | 5.1809 | −0.68343 | 0.26043 | 5.1809 | −1.1758 | 0.87039 | 5.61843 | 1.57384 | −1.59965 | 5.61843 |
| 0.9949 | −1.18905 | 5.1809 | −0.74561 | 0.3274 | 5.1809 | −1.17749 | 0.86052 | 5.61843 | 1.57441 | −1.59668 | 5.61843 |
| 1.07992 | −1.22162 | 5.1809 | −0.80469 | 0.39226 | 5.1809 | −1.17763 | 0.84868 | 5.61843 | 1.57441 | −1.59062 | 5.61843 |
| 1.1617 | −1.25138 | 5.1809 | −0.86081 | 0.45501 | 5.1809 | −1.17608 | 0.83303 | 5.61843 | 1.5713 | −1.58174 | 5.61843 |
| 1.24038 | −1.27887 | 5.1809 | −0.91171 | 0.51268 | 5.1809 | −1.17242 | 0.81287 | 5.61843 | 1.55847 | −1.57102 | 5.61843 |
| 1.31229 | −1.30298 | 5.1809 | −0.95739 | 0.56499 | 5.1809 | −1.16607 | 0.78805 | 5.61843 | 1.53761 | −1.562 | 5.61843 |
| 1.37715 | −1.32385 | 5.1809 | −0.998 | 0.61208 | 5.1809 | −1.15691 | 0.75858 | 5.61843 | 1.51011 | −1.54987 | 5.61843 |
| 1.43496 | −1.3419 | 5.1809 | −1.03395 | 0.65354 | 5.1809 | −1.14422 | 0.72389 | 5.61843 | 1.47557 | −1.5345 | 5.61843 |
| 1.48938 | −1.35839 | 5.1809 | −1.06554 | 0.68907 | 5.1809 | −1.12758 | 0.68399 | 5.61843 | 1.43101 | −1.51406 | 5.61843 |
| 1.53662 | −1.37221 | 5.1809 | −1.09303 | 0.7184 | 5.1809 | −1.10657 | 0.63746 | 5.61843 | 1.37983 | −1.48995 | 5.61843 |
| 1.573 | −1.38273 | 5.1809 | −1.11743 | 0.74279 | 5.1809 | −1.08091 | 0.58459 | 5.61843 | 1.32554 | −1.46358 | 5.61843 |
| 1.60218 | −1.39097 | 5.1809 | −1.13858 | 0.76225 | 5.1809 | −1.05101 | 0.52508 | 5.61843 | 1.26491 | −1.43312 | 5.61843 |
| 1.62418 | −1.39703 | 5.1809 | −1.15705 | 0.77733 | 5.1809 | −1.01647 | 0.4591 | 5.61843 | 1.19808 | −1.3983 | 5.61843 |
| 1.64082 | −1.39632 | 5.1809 | −1.17256 | 0.78847 | 5.1809 | −0.97727 | 0.38676 | 5.61843 | 1.12518 | −1.35882 | 5.61843 |
| 1.64885 | −1.39111 | 5.1809 | −1.18511 | 0.7958 | 5.1809 | −0.93257 | 0.30851 | 5.61843 | 1.04975 | −1.31624 | 5.61843 |
| 1.65266 | −1.38645 | 5.1809 | −1.19512 | 0.80018 | 5.1809 | −0.88463 | 0.22743 | 5.61843 | 0.97177 | −1.27027 | 5.61843 |
| 1.65407 | −1.38377 | 5.1809 | −1.204 | 0.80243 | 5.1809 | −0.83317 | 0.1441 | 5.61843 | 0.8914 | −1.22092 | 5.61843 |
| 1.65478 | −1.38236 | 5.1809 | −1.21133 | 0.80229 | 5.1809 | −0.7779 | 0.05908 | 5.61843 | 0.80892 | −1.16804 | 5.61843 |
| −1.19145 | 0.84177 | 5.42075 | 1.62023 | −1.49404 | 5.42075 | −0.71868 | −0.02792 | 5.61843 | 0.72446 | −1.11164 | 5.61843 |
| −1.19568 | 0.83768 | 5.42075 | 1.62037 | −1.49333 | 5.42075 | −0.65551 | −0.11647 | 5.61843 | 0.63817 | −1.05158 | 5.61843 |
| −1.19892 | 0.83049 | 5.42075 | 1.6208 | −1.49192 | 5.42075 | −0.58797 | −0.20642 | 5.61843 | 0.5499 | −0.98742 | 5.61843 |
| −1.20019 | 0.8209 | 5.42075 | 1.62136 | −1.4891 | 5.42075 | −0.51606 | −0.29751 | 5.61843 | 0.45994 | −0.91946 | 5.61843 |
| −1.20005 | 0.80934 | 5.42075 | 1.6215 | −1.48304 | 5.42075 | −0.44161 | −0.38676 | 5.61843 | 0.37125 | −0.84995 | 5.61843 |
| −1.19794 | 0.79397 | 5.42075 | 1.61868 | −1.4743 | 5.42075 | −0.36505 | −0.4739 | 5.61843 | 0.28355 | −0.77874 | 5.61843 |
| −1.19357 | 0.77437 | 5.42075 | 1.60627 | −1.46344 | 5.42075 | −0.28595 | −0.55892 | 5.61843 | 0.19698 | −0.70627 | 5.61843 |
| −1.18637 | 0.7504 | 5.42075 | 1.58569 | −1.45484 | 5.42075 | −0.20445 | −0.64183 | 5.61843 | 0.11153 | −0.63224 | 5.61843 |
| −1.17594 | 0.72192 | 5.42075 | 1.55833 | −1.44314 | 5.42075 | −0.12041 | −0.72263 | 5.61843 | 0.02764 | −0.55667 | 5.61843 |
| −1.16184 | 0.68879 | 5.42075 | 1.52421 | −1.42833 | 5.42075 | −0.03398 | −0.8013 | 5.61843 | −0.05443 | −0.4794 | 5.61843 |
| −1.14351 | 0.65057 | 5.42075 | 1.47994 | −1.40887 | 5.42075 | 0.05541 | −0.87744 | 5.61843 | −0.13466 | −0.4003 | 5.61843 |
| −1.12053 | 0.6063 | 5.42075 | 1.42904 | −1.38575 | 5.42075 | 0.14777 | −0.95062 | 5.61843 | −0.21319 | −0.31937 | 5.61843 |
| −1.09247 | 0.55596 | 5.42075 | 1.37517 | −1.36065 | 5.42075 | 0.24238 | −1.01999 | 5.61843 | −0.2899 | −0.23688 | 5.61843 |
| −1.0599 | 0.49942 | 5.42075 | 1.31483 | −1.33175 | 5.42075 | 0.33882 | −1.0857 | 5.61843 | −0.36491 | −0.1527 | 5.61843 |
| −1.02253 | 0.43696 | 5.42075 | 1.24827 | −1.29861 | 5.42075 | 0.4371 | −1.14802 | 5.61843 | −0.43837 | −0.06698 | 5.61843 |
| −0.98009 | 0.36843 | 5.42075 | 1.17552 | −1.2611 | 5.42075 | 0.53369 | −1.20499 | 5.61843 | −0.50802 | 0.01734 | 5.61843 |
| −0.93201 | 0.29455 | 5.42075 | 1.10008 | −1.22078 | 5.42075 | 0.62844 | −1.25716 | 5.61843 | −0.57359 | 0.09983 | 5.61843 |
| −0.88055 | 0.21813 | 5.42075 | 1.02211 | −1.17735 | 5.42075 | 0.72107 | −1.30496 | 5.61843 | −0.63577 | 0.18034 | 5.61843 |
| −0.82541 | 0.13945 | 5.42075 | 0.94174 | −1.13082 | 5.42075 | 0.81146 | −1.34867 | 5.61843 | −0.69443 | 0.25874 | 5.61843 |
| −0.76634 | 0.05936 | 5.42075 | 0.85897 | −1.08091 | 5.42075 | 0.8993 | −1.38871 | 5.61843 | −0.74984 | 0.33488 | 5.61843 |
| −0.70359 | −0.02242 | 5.42075 | 0.77395 | −1.02775 | 5.42075 | 0.9846 | −1.42537 | 5.61843 | −0.80215 | 0.40862 | 5.61843 |
| −0.6369 | −0.10561 | 5.42075 | 0.68695 | −0.97101 | 5.42075 | 1.06723 | −1.45893 | 5.61843 | −0.85164 | 0.47982 | 5.61843 |
| −0.56597 | −0.18979 | 5.42075 | 0.59798 | −0.91072 | 5.42075 | 1.14704 | −1.48938 | 5.61843 | −0.8962 | 0.54511 | 5.61843 |
| −0.49068 | −0.27509 | 5.42075 | 0.50718 | −0.84656 | 5.42075 | 1.22021 | −1.51603 | 5.61843 | −0.93624 | 0.60447 | 5.61843 |
| −0.41327 | −0.35842 | 5.42075 | 0.41736 | −0.78086 | 5.42075 | 1.28663 | −1.53887 | 5.61843 | −0.97163 | 0.65791 | 5.61843 |
| −0.33403 | −0.43978 | 5.42075 | 0.32853 | −0.71388 | 5.42075 | 1.34613 | −1.55863 | 5.61843 | −1.00293 | 0.705 | 5.61843 |
| −0.25253 | −0.51888 | 5.42075 | 0.24041 | −0.64564 | 5.42075 | 1.4021 | −1.57596 | 5.61843 | −1.03057 | 0.74547 | 5.61843 |
| −0.16892 | −0.59601 | 5.42075 | 0.15327 | −0.57641 | 5.42075 | 1.45089 | −1.59076 | 5.61843 | −1.05454 | 0.77917 | 5.61843 |
| −0.08319 | −0.67102 | 5.42075 | 0.06712 | −0.50563 | 5.42075 | 1.4884 | −1.60162 | 5.61843 | −1.07597 | 0.80737 | 5.61843 |
| 0.00465 | −0.74378 | 5.42075 | −0.01748 | −0.43329 | 5.42075 | 1.51857 | −1.61022 | 5.61843 | −1.09487 | 0.83035 | 5.61843 |
| 0.09518 | −0.81399 | 5.42075 | −0.10039 | −0.35927 | 5.42075 | 1.54113 | −1.61657 | 5.61843 | −1.11136 | 0.8484 | 5.61843 |
| 0.18852 | −0.88139 | 5.42075 | −0.18175 | −0.28355 | 5.42075 | 1.55833 | −1.61642 | 5.61843 | −1.12546 | 0.86207 | 5.61843 |
| 0.28468 | −0.94583 | 5.42075 | −0.26141 | −0.20614 | 5.42075 | 1.56665 | −1.61149 | 5.61843 | −1.13717 | 0.87166 | 5.61843 |
| 0.38267 | −1.00688 | 5.42075 | −0.33967 | −0.12718 | 5.42075 | 1.5706 | −1.6067 | 5.61843 | −1.14661 | 0.87787 | 5.61843 |
| 0.4825 | −1.06483 | 5.42075 | −0.41637 | −0.04681 | 5.42075 | 1.57215 | −1.60402 | 5.61843 | −1.15521 | 0.88167 | 5.61843 |
| 0.58064 | −1.11827 | 5.42075 | −0.48927 | 0.03229 | 5.42075 | 1.57286 | −1.60261 | 5.61843 | −1.16255 | 0.8828 | 5.61843 |
| 0.6768 | −1.1672 | 5.42075 | −0.5585 | 0.10984 | 5.42075 | −1.12335 | 0.95457 | 5.97135 | 1.47289 | −1.80748 | 5.97135 |
| 0.77071 | −1.21232 | 5.42075 | −0.62421 | 0.1857 | 5.42075 | −1.12828 | 0.9509 | 5.97135 | 1.47317 | −1.80677 | 5.97135 |
| 0.86207 | −1.25363 | 5.42075 | −0.68639 | 0.25944 | 5.42075 | −1.13195 | 0.94343 | 5.97135 | 1.47359 | −1.80522 | 5.97135 |
| 0.95062 | −1.29156 | 5.42075 | −0.74533 | 0.33121 | 5.42075 | −1.13406 | 0.93342 | 5.97135 | 1.47416 | −1.80226 | 5.97135 |
| 1.03635 | −1.32625 | 5.42075 | −0.80116 | 0.40072 | 5.42075 | −1.13491 | 0.92129 | 5.97135 | 1.47401 | −1.79606 | 5.97135 |
| 1.11912 | −1.35811 | 5.42075 | −0.85418 | 0.46784 | 5.42075 | −1.13449 | 0.90494 | 5.97135 | 1.47091 | −1.78703 | 5.97135 |
| 1.19892 | −1.38716 | 5.42075 | −0.90419 | 0.52946 | 5.42075 | −1.13237 | 0.88393 | 5.97135 | 1.45808 | −1.7759 | 5.97135 |
| 1.27168 | −1.41254 | 5.42075 | −0.94498 | 0.58543 | 5.42075 | −1.12814 | 0.85813 | 5.97135 | 1.43693 | −1.76603 | 5.97135 |
| 1.33767 | −1.43439 | 5.42075 | −0.98319 | 0.63577 | 5.42075 | −1.12137 | 0.82682 | 5.97135 | 1.40887 | −1.75263 | 5.97135 |
| 1.39646 | −1.45315 | 5.42075 | −1.01689 | 0.68004 | 5.42075 | −1.11193 | 0.79002 | 5.97135 | 1.37405 | −1.73571 | 5.97135 |
| 1.45174 | −1.47007 | 5.42075 | −1.04664 | 0.71811 | 5.42075 | −1.0991 | 0.74744 | 5.97135 | 1.32878 | −1.71315 | 5.97135 |
| 1.49982 | −1.48417 | 5.42075 | −1.07245 | 0.7497 | 5.42075 | −1.08246 | 0.69753 | 5.97135 | 1.27704 | −1.68636 | 5.97135 |

TABLE I-continued

| Suction Side or Surface | | | Pressure Side or Surface | | |
|---|---|---|---|---|---|
| X | Y | Z | X | Y | Z |
| −1.06201 | 0.64042 | 5.97135 | 1.22233 | −1.65717 | 5.97135 |
| −1.0379 | 0.57613 | 5.97135 | 1.16114 | −1.62347 | 5.97135 |
| −1.00984 | 0.50478 | 5.97135 | 1.09388 | −1.58484 | 5.97135 |
| −0.97755 | 0.42638 | 5.97135 | 1.02084 | −1.54113 | 5.97135 |
| −0.94047 | 0.34122 | 5.97135 | 0.94526 | −1.4939 | 5.97135 |
| −0.90029 | 0.25281 | 5.97135 | 0.86743 | −1.44285 | 5.97135 |
| −0.85672 | 0.16173 | 5.97135 | 0.78734 | −1.388 | 5.97135 |
| −0.80934 | 0.06853 | 5.97135 | 0.70542 | −1.32921 | 5.97135 |
| −0.7583 | −0.02707 | 5.97135 | 0.62181 | −1.26632 | 5.97135 |
| −0.70317 | −0.12479 | 5.97135 | 0.53651 | −1.19935 | 5.97135 |
| −0.64352 | −0.22419 | 5.97135 | 0.44993 | −1.128 | 5.97135 |
| −0.57923 | −0.32515 | 5.97135 | 0.36181 | −1.05242 | 5.97135 |
| −0.51225 | −0.42427 | 5.97135 | 0.27523 | −0.97502 | 5.97135 |
| −0.44246 | −0.52142 | 5.97135 | 0.19007 | −0.89577 | 5.97135 |
| −0.3697 | −0.61673 | 5.97135 | 0.1066 | −0.81484 | 5.97135 |
| −0.29413 | −0.70994 | 5.97135 | 0.02496 | −0.73207 | 5.97135 |
| −0.21545 | −0.80102 | 5.97135 | −0.05443 | −0.64719 | 5.97135 |
| −0.13367 | −0.88999 | 5.97135 | −0.13155 | −0.56062 | 5.97135 |
| −0.04879 | −0.97671 | 5.97135 | −0.20642 | −0.47207 | 5.97135 |
| 0.03892 | −1.06018 | 5.97135 | −0.27932 | −0.38169 | 5.97135 |
| 0.12944 | −1.1397 | 5.97135 | −0.35024 | −0.28961 | 5.97135 |
| 0.2225 | −1.21528 | 5.97135 | −0.41919 | −0.19599 | 5.97135 |
| 0.31838 | −1.28691 | 5.97135 | −0.48603 | −0.10082 | 5.97135 |
| 0.41355 | −1.35275 | 5.97135 | −0.54863 | −0.00761 | 5.97135 |
| 0.50774 | −1.41296 | 5.97135 | −0.60743 | 0.08361 | 5.97135 |
| 0.60052 | −1.46823 | 5.97135 | −0.66256 | 0.17244 | 5.97135 |
| 0.69175 | −1.51857 | 5.97135 | −0.71431 | 0.25888 | 5.97135 |
| 0.78114 | −1.56468 | 5.97135 | −0.76267 | 0.34291 | 5.97135 |
| 0.86842 | −1.60684 | 5.97135 | −0.80821 | 0.42413 | 5.97135 |
| 0.9533 | −1.64505 | 5.97135 | −0.85094 | 0.50238 | 5.97135 |
| 1.03522 | −1.67959 | 5.97135 | −0.88915 | 0.57429 | 5.97135 |
| 1.11038 | −1.70948 | 5.97135 | −0.92313 | 0.63972 | 5.97135 |
| 1.17862 | −1.73515 | 5.97135 | −0.95316 | 0.69837 | 5.97135 |
| 1.23953 | −1.757 | 5.97135 | −0.97953 | 0.75026 | 5.97135 |
| 1.29706 | −1.7766 | 5.97135 | −1.00265 | 0.7951 | 5.97135 |
| 1.34697 | −1.79296 | 5.97135 | −1.02296 | 0.83261 | 5.97135 |
| 1.38561 | −1.80494 | 5.97135 | −1.04114 | 0.86419 | 5.97135 |
| 1.41663 | −1.81439 | 5.97135 | −1.05722 | 0.89027 | 5.97135 |
| 1.43989 | −1.8213 | 5.97135 | −1.07146 | 0.91114 | 5.97135 |
| 1.45752 | −1.82214 | 5.97135 | −1.08373 | 0.92708 | 5.97135 |
| 1.46626 | −1.81721 | 5.97135 | −1.09402 | 0.93878 | 5.97135 |
| 1.47035 | −1.81241 | 5.97135 | −1.10248 | 0.94667 | 5.97135 |
| 1.4719 | −1.80974 | 5.97135 | −1.11038 | 0.95217 | 5.97135 |
| 1.4726 | −1.80818 | 5.97135 | −1.11757 | 0.95499 | 5.97135 |

It is noted that the first column of TABLE I lists X coordinate values of the pressure side at each respective Z coordinate value of the third column, the second column lists Y coordinate values of the pressure side at each respective Z coordinate value of the third column, the fourth column lists X coordinate values of the suction side at each respective Z coordinate value of the sixth column, and the fifth column lists Y coordinate values of the suction side at each respective Z coordinate value of the sixth column. The Z coordinate values of the third column and the sixth column are equal to each other for each respective row. As set forth in TABLE I, at each respective Z coordinate value, the airfoil shape 110 of the airfoil 82 (e.g., a cross-sectional profile taken through line 6-6 of FIGS. 3, 4, and 5) is defined by multiple sets of Cartesian coordinate values of X, Y, and Z for both the suction side 62 (e.g., suction side profile 112) and the pressure side 64 (e.g., pressure side profile 114). For example, at each respective Z coordinate value, the suction side profile 112 of the suction side 62 may be defined by at least equal to or greater than 10, 15, 20, 25, 30, 35, 40, 45, 50, or 55 (e.g., 56) sets of Cartesian coordinate values of X, Y, and Z. Similarly, at each respective Z coordinate value, the pressure side profile 114 of the pressure side 64 may be defined by at least equal to or greater than 10, 15, 20, 25, 30, 35, 40, 45, 50, or 55 (e.g., 56) sets of Cartesian coordinate values of X, Y, and Z. Furthermore, in the Z direction along the Z axis 74, the airfoil profile of the airfoil 82 may be defined by multiple sets of Cartesian coordinate values of X, Y, and Z at multiple Cartesian coordinate values of Z, such as at least equal to or greater than 2, 3, 4, 5, 6, 7, 8, 9, 10, 11, 12, 13, 14, 15, 16, 17, 18, 19, 20, 21, 22, 23, 24, 25, 26, 27, 28, 29, 30, or more Cartesian coordinate values of Z.

As noted above, the Cartesian coordinate values of X, Y, and Z as set forth in TABLE I may be non-dimensional values convertible to dimensional distances. For example, the Cartesian coordinate values of X, Y, and Z may be multiplied by a scale factor F (e.g., F equal to 1, greater than 1, or less than 1) to obtain the desired dimensional distances. In certain embodiments, a nominal airfoil profile of the airfoil 82 may be partially or entirely (e.g., all or part of the suction side 62, all or part of the pressure side 64, or a combination thereof) defined by the Cartesian coordinate values of X, Y, and Z as set forth in TABLE I. The nominal airfoil profile of the airfoil 82 also may be covered by the coating 120, which increases the X and Y values as set forth in TABLE I.

For example, the airfoil 82 may include a first suction portion (e.g., 80) of the nominal airfoil profile substantially in accordance with Cartesian coordinate values of X, Y, and Z of the suction side 62 as set forth in TABLE I, wherein the X and Y values of the suction side 62 are coordinate values that couple together (e.g., in a smooth continuous and/or curved manner) to define suction side sections of the first suction portion (e.g., 80) of the nominal airfoil profile at each Z coordinate value, and the suction side sections of the first suction portion (e.g., 80) of the nominal airfoil profile are coupled together (e.g., in a smooth continuous and/or curved manner) to define the first suction portion (e.g., 80). In such an embodiment, the airfoil 82 has an airfoil length L along the Z axis 74, and the first suction portion (e.g., 80) comprises a first portion length l along the Z axis as illustrated and described above with reference to FIG. 4. The first portion length l is less than or equal to the airfoil length L. The first portion length l may include greater than or equal to 2, 3, 4, 5, 6, 7, 8, 9, 10, 11, 12, 13, 14, 15, 16, 17, 18, 19, 20, 21, 22, 23, 24, 25, 26, 27, 28, 29, 30, or more Cartesian coordinate values of Z (e.g., consecutive values of Z) in TABLE I. The first portion length l may be equal to or greater than approximately 5, 10, 15, 20, 25, 30, 35, 40, 45, 50, 55, 60, 65, 70, 75, 80, 85, 90, 95, 99, or 100 percent of the airfoil length L.

By further example, the airfoil 82 may include a second suction portion (e.g., 80) of the nominal airfoil profile substantially in accordance with the Cartesian coordinate values of X, Y, and Z of the suction side 62 as set forth in TABLE I, wherein the X and Y values of the suction side 62 are coordinate values that couple together (e.g., in a smooth continuous and/or curved manner) to define suction side sections of the second suction portion (e.g., 80) of the nominal airfoil profile at each Z coordinate value, the suction side sections of the second suction portion (e.g., 80) of the nominal airfoil profile are coupled together (e.g., in a smooth continuous and/or curved manner) to define the second suction portion (e.g., 80). In such an embodiment, the second suction portion (e.g., 80) has a second portion length l along the Z axis, the second portion length l is less than or equal to the airfoil length L, and the first and second suction portions (e.g., 80, 102, 104, 106) are offset from one another along the Z axis as illustrated and described above with reference to FIGS. 4 and 5. Again, the second portion length l may include greater than or equal to 2, 3, 4, 5, 6, 7, 8, 9, 10, 11, 12, 13, 14, 15, 16, 17, 18, 19, 20, 21, 22, 23, 24, 25, 26, 27, 28, 29, 30, or more Cartesian coordinate values of Z (e.g., consecutive values of Z) in TABLE I. The second portion length l may be equal to or greater than approximately 5, 10, 15, 20, 25, 30, 35, 40, 45, 50, 55, 60, 65, 70, 75, 80, 85, 90, 95, 99, or 100 percent of the airfoil length L. Furthermore, the first and second suction portions (e.g., 80, 102, 104, 106) may be separated by an offset distance of equal to or greater than approximately 5, 10, 15, 20, 25, 30, 35, 40, 45, 50, 55, 60, 65, 70, 75, 80, 85, or 90 percent of the airfoil length L.

By further example, the airfoil 82 may include a first pressure portion (e.g., 80) of the nominal airfoil profile substantially in accordance with the Cartesian coordinate values of X, Y, and Z of the pressure side 64 as set forth in TABLE I, wherein the X and Y values of the pressure side 64 are coordinate values that couple together (e.g., in a smooth continuous and/or curved manner) to define pressure side sections of the first pressure portion (e.g., 80) of the nominal airfoil profile at each Z coordinate value, the pressure side sections of the first pressure portion (e.g., 80) of the nominal airfoil profile are coupled together (e.g., in a smooth continuous and/or curved manner) to define the first pressure portion (e.g., 80). In such an embodiment, the first pressure portion (e.g., 80) comprises a second portion length l along the Z axis, and the second portion length l is less than or equal to the airfoil length L as illustrated and described above with reference to FIG. 4. Similar to the first suction portion (e.g., 80), the second portion length l of the first pressure portion (e.g., 80) may include greater than or equal to 2, 3, 4, 5, 6, 7, 8, 9, 10, 11, 12, 13, 14, 15, 16, 17, 18, 19, 20, 21, 22, 23, 24, 25, 26, 27, 28, 29, 30, or more Cartesian coordinate values of Z (e.g., consecutive values of Z) in TABLE I. The second portion length l of the first pressure portion (e.g., 80) may be equal to or greater than approximately 5, 10, 15, 20, 25, 30, 35, 40, 45, 50, 55, 60, 65, 70, 75, 80, 85, 90, 95, 99, or 100 percent of the airfoil length L. In certain embodiments, the first suction portion (e.g., 80) and the first pressure portion (e.g., 80) at least partially overlap with one another along the Z axis.

For example, in certain embodiments, the first and second portion lengths l may be substantially the same, and the first and second portion lengths l may start at a common distance d relative to the base 60 of the airfoil 82 and extend toward the tip 68 of the airfoil 82. However, in some embodiments, the first and second portion lengths l may be different from one another, the first and second portion lengths l may start at different distances d relative to the base 60 of the airfoil 82, or a combination thereof. Additionally, the airfoil 82 may include a second pressure portion (e.g., 80) of the nominal airfoil profile substantially in accordance with the Cartesian coordinate values of X, Y, and Z of the pressure side 64 as set forth in TABLE I, wherein the first and second pressure portions (e.g., 80, 102, 104, 106) are offset from one another along the Z axis 74.

Technical effects of the disclosed embodiments include an airfoil having a first suction portion of a nominal airfoil profile substantially in accordance with Cartesian coordinate values of X, Y, and Z of a suction side as set forth in TABLE I, wherein the X and Y values of the suction side are coordinate values that couple together to define suction side sections of the first suction portion of the nominal airfoil profile at each Z coordinate value, the suction side sections of the first suction portion of the nominal airfoil profile are coupled together to define the first suction portion, the airfoil includes an airfoil length along a Z axis, the first suction portion comprises a first portion length along the Z axis, the first portion length is less than or equal to the airfoil length, and the Cartesian coordinate values of X, Y, and Z are non-dimensional values convertible to dimensional distances (e.g., instances in inches or mm).

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system comprising:
an airfoil comprising a first suction portion of a nominal airfoil profile substantially in accordance with Cartesian coordinate values of X, Y, and Z of a suction side as set forth in TABLE I to a maximum of three decimal places, wherein the X and Y values of the suction side are coordinate values that couple together to define suction side sections of the first suction portion of the nominal airfoil profile at each Z coordinate value, the suction side sections of the first suction portion of the nominal airfoil profile are coupled together to define the first suction portion, the airfoil comprises an airfoil length along a Z axis, the first suction portion comprises a first portion length along the Z axis, the first portion length is less than or equal to the airfoil length, and the Cartesian coordinate values of X, Y, and Z are non-dimensional values convertible to dimensional distances using a scale factor, and
wherein the Cartesian coordinate values of X, Y and Z are defined from a point of origin which is a mid-point of the suction side of a base of the airfoil.

2. The system of claim 1, wherein the airfoil comprises a second suction portion of the nominal airfoil profile substantially in accordance with the Cartesian coordinate values of X, Y, and Z of the suction side as set forth in TABLE I to the maximum of three decimal places, wherein the X and Y values of the suction side are coordinate values that couple together to define suction side sections of the second suction portion of the nominal airfoil profile at each Z coordinate value, the suction side sections of the second suction portion of the nominal airfoil profile are coupled together to define the second suction portion, the second suction portion comprises a second portion length along the Z axis, the second portion length is less than or equal to the airfoil length, and the first and second suction portions are offset from one another along the Z axis.

3. The system of claim 1, wherein the airfoil comprises a first pressure portion of the nominal airfoil profile substantially in accordance with the Cartesian coordinate values of X, Y, and Z of a pressure side as set forth in TABLE I to the maximum of three decimal places, wherein the X and Y values of the pressure side are coordinate values that couple together to define pressure side sections of the first pressure portion of the nominal airfoil profile at each Z coordinate value, the pressure side sections of the first pressure portion of the nominal airfoil profile are coupled together to define the first pressure portion, the first pressure portion comprises a second portion length along the Z axis, and the second portion length is less than or equal to the airfoil length.

4. The system of claim 3, wherein the first suction portion and the first pressure portion at least partially overlap with one another along the Z axis.

5. The system of claim 4, wherein the first and second portion lengths are substantially the same, and the first and second portion lengths start at a common distance relative to a base of the airfoil and extend toward a tip of the airfoil.

6. The system of claim 1, wherein the first portion length of the first suction portion starts at a distance relative to a base of the airfoil and extends toward a tip of the airfoil.

7. The system of claim 1, wherein the first portion length includes greater than or equal to two consecutive Cartesian coordinate values of Z in TABLE I.

8. The system of claim 1, wherein the first portion length is equal to or greater than approximately 10 percent of the airfoil length.

9. The system of claim 1, wherein the first portion length is equal to or greater than approximately 25 percent of the airfoil length.

10. The system of claim 1, wherein the first portion length is equal to or greater than approximately 50 percent of the airfoil length.

11. The system of claim 1, wherein the first portion length is equal to or greater than approximately 75 percent of the airfoil length.

12. The system of claim 1, wherein the first portion length is equal to approximately 100 percent of the airfoil length.

13. The system of claim 1, wherein the airfoil comprises the nominal airfoil profile substantially in accordance with Cartesian coordinate values of X, Y, and Z as set forth in TABLE I to the maximum of three decimal places along an entirety of both the suction side and a pressure side of the airfoil.

14. The system of claim 1, wherein the airfoil comprises a coating disposed over the first suction portion of the nominal airfoil profile substantially in accordance with the Cartesian coordinate values of X, Y, and Z of the suction side as set forth in TABLE I to the maximum of three decimal places.

15. The system of claim 14, wherein the coating increases the X and Y values of the suction side in TABLE I to the maximum of three decimal places by no greater than approximately 3.5 mm along the first suction portion.

16. The system of claim 1, comprising a plurality of compressor airfoils of a compressor stage, wherein each of the plurality of compressor airfoils comprises the airfoil having the first suction portion of the nominal airfoil profile substantially in accordance with the Cartesian coordinate values of X, Y, and Z of the suction side as set forth in TABLE I to the maximum of three decimal places.

17. The system of claim 1, comprising a compressor having the airfoil.

18. The system of claim 17, comprising a gas turbine engine having the compressor, a combustor, and a turbine.

19. The system of claim 1, wherein the airfoil is a twelfth stage compressor airfoil.

20. The system of claim 19, wherein the airfoil is a compressor stator vane.

21. The system of claim 1, wherein the airfoil comprises the first suction portion of the nominal airfoil profile substantially in accordance with Cartesian coordinate values of X, Y, and Z of the suction side as set forth in TABLE I to a maximum of four decimal places.

22. The system of claim 1, wherein the airfoil comprises the first suction portion of the nominal airfoil profile substantially in accordance with Cartesian coordinate values of X, Y, and Z of the suction side as set forth in TABLE I to a maximum of five decimal places.

23. A system comprising:
an airfoil comprising a suction side of a nominal airfoil profile substantially in accordance with Cartesian coordinate values of X, Y, and Z of the suction side as set forth in TABLE I to a maximum of three decimal places, wherein the X and Y values of the suction side are coordinate values that couple together to define suction side sections of the suction side of the nominal airfoil profile at each Z coordinate value, the suction side sections of the suction side of the nominal airfoil profile are coupled together to define the suction side, and the Cartesian coordinate values of X, Y, and Z are non-dimensional values convertible to dimensional distances using a scale factor, and
wherein the Cartesian coordinate values of X, Y and Z are defined from a point of origin which is a mid-point of the suction side of a base of the airfoil.

24. A system comprising:
an airfoil comprising a nominal airfoil profile substantially in accordance with Cartesian coordinate values of X, Y, and Z as set forth in TABLE I to a maximum of three decimal places, wherein the X and Y values are coordinate values that couple together to define airfoil sections of the nominal airfoil profile at each Z coordinate value, the airfoil sections of the nominal airfoil profile are coupled together to define an entirety of the airfoil, and the Cartesian coordinate values of X, Y, and Z are non-dimensional values convertible to dimensional distances using a scale factor, and
wherein the Cartesian coordinate values of X, Y and Z are defined from a point of origin which is a mid-point of a suction side of a base of the airfoil.

* * * * *